(12) United States Patent
Adams et al.

(10) Patent No.: US 8,869,309 B2
(45) Date of Patent: Oct. 21, 2014

(54) DYNAMICALLY RECONFIGURABLE 2D TOPOLOGY COMMUNICATION AND VERIFICATION SCHEME

(75) Inventors: Christian Adams, Yalaha, FL (US);
Matthew Kelley, Orlando, FL (US);
David Duncan, Orlando, FL (US)

(73) Assignee: Lockheed Martin Corporation,
Bethesda, MD (US)

( * ) Notice: Subject to any disclaimer, the term of this patent is extended or adjusted under 35 U.S.C. 154(b) by 0 days.

(21) Appl. No.: 14/111,109

(22) PCT Filed: Apr. 12, 2012

(86) PCT No.: PCT/US2012/033320
§ 371 (c)(1),
(2), (4) Date: Oct. 10, 2013

(87) PCT Pub. No.: WO2012/142287
PCT Pub. Date: Oct. 18, 2012

(65) Prior Publication Data
US 2014/0053286 A1    Feb. 20, 2014

Related U.S. Application Data

(60) Provisional application No. 61/475,536, filed on Apr. 14, 2011.

(51) Int. Cl.
*G06F 1/26* (2006.01)
*G06F 11/00* (2006.01)
*G08B 13/00* (2006.01)
*G08B 21/00* (2006.01)
*G08B 29/00* (2006.01)
*G06F 21/86* (2013.01)

(52) U.S. Cl.
CPC ..................................... *G06F 21/86* (2013.01)
USPC .......................................................... 726/34

(58) Field of Classification Search
USPC .......................................................... 726/34
See application file for complete search history.

(56) References Cited

U.S. PATENT DOCUMENTS

| 8,516,269 | B1 * | 8/2013 | Hamlet et al. ................ 713/189 |
| 2003/0169858 | A1 | 9/2003 | Boehmer |
| 2004/0032834 | A1 | 2/2004 | Hetrick et al. |
| 2004/0100684 | A1 | 5/2004 | Jones et al. |
| 2005/0213564 | A1 | 9/2005 | Nguyen et al. |
| 2009/0146267 | A1 * | 6/2009 | Peytavy et al. ................ 257/659 |
| 2009/0265758 | A1 * | 10/2009 | Tuyls ................................ 726/2 |

* cited by examiner

*Primary Examiner* — Andrew Nalven
*Assistant Examiner* — Khang Do
(74) *Attorney, Agent, or Firm* — Terry M. Sanks, Esq; Beusse Wolter Sanks & Maire, P.A.

(57) ABSTRACT

Systems and methods for securing devices and encoding information in hardware and hardware arrangements are provided. Variations include switched networks included in conformal coatings applied to or connected to components to be protected or encoded. The decoding or security key data is included as part of the network layout and/or switching logic such that physical changes to the network prevent the recovery of the key data. Nodes in the network may include sensors meant to change node or network behavior based on sensor detection results.

41 Claims, 22 Drawing Sheets

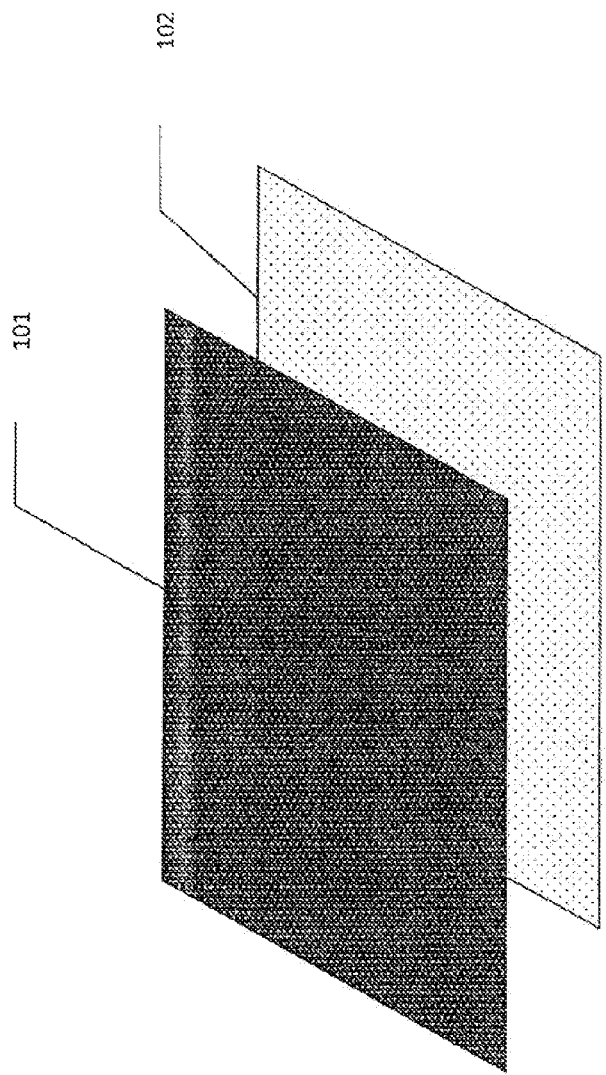

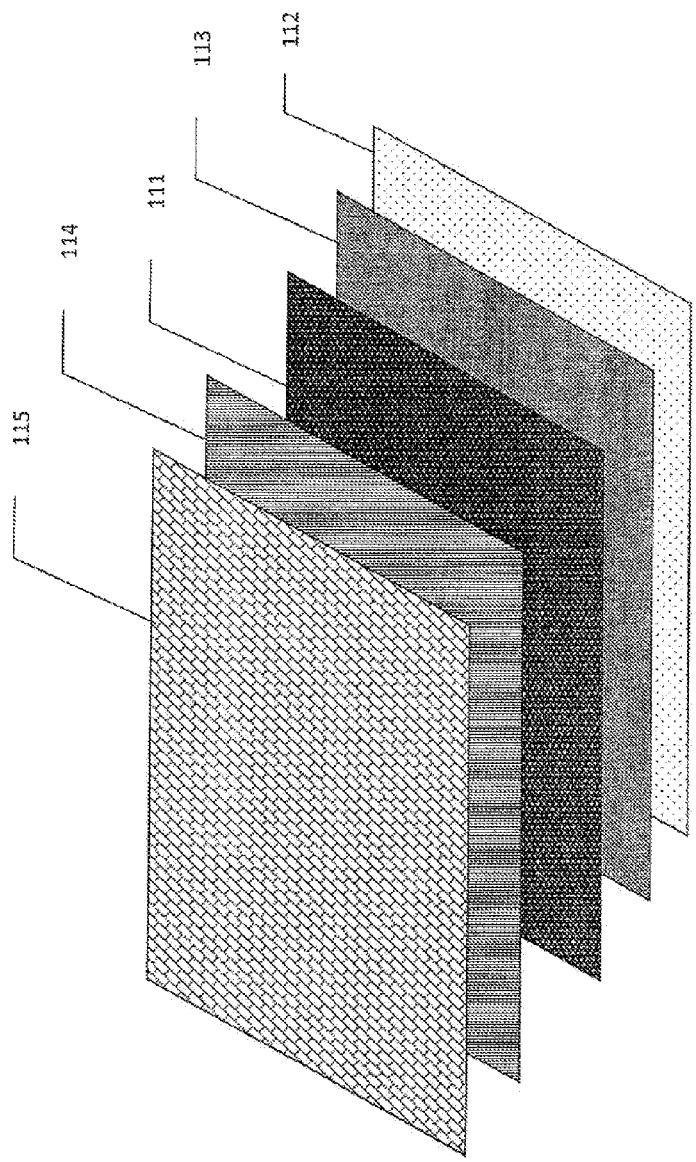

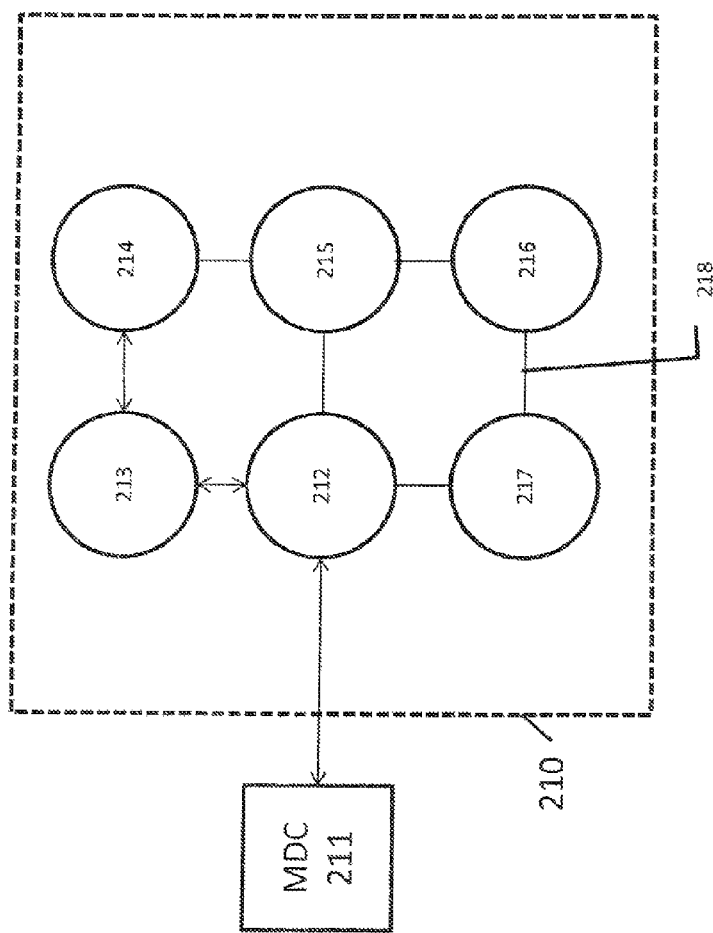

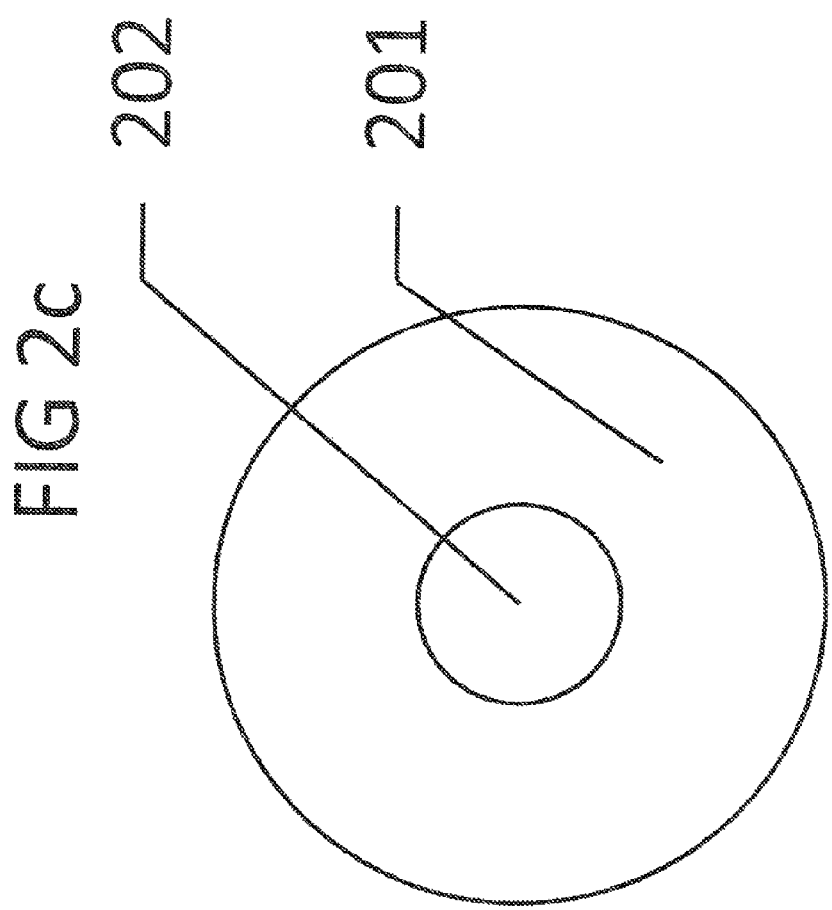

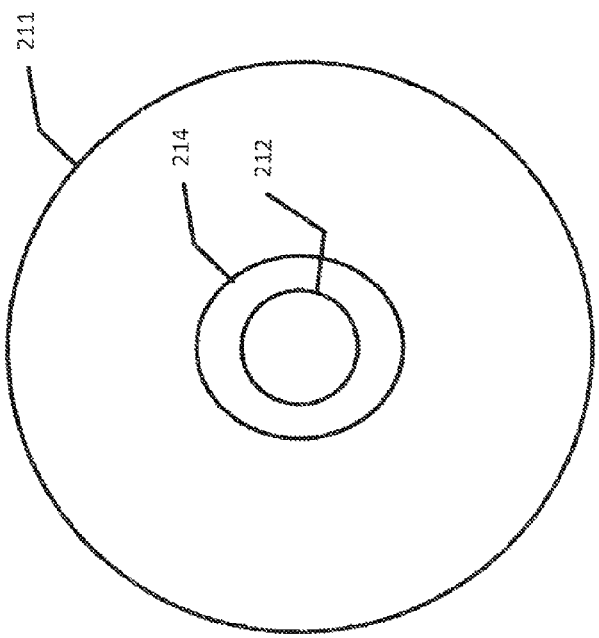

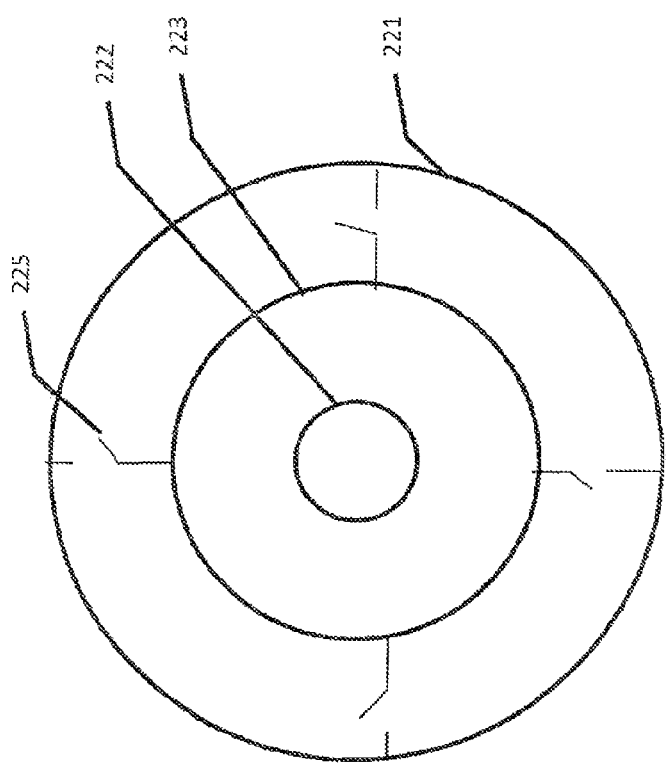

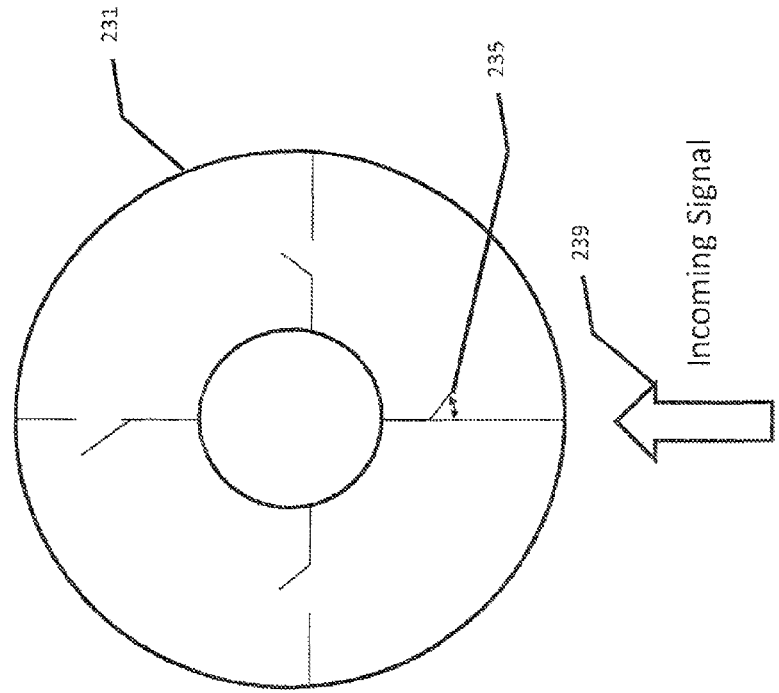

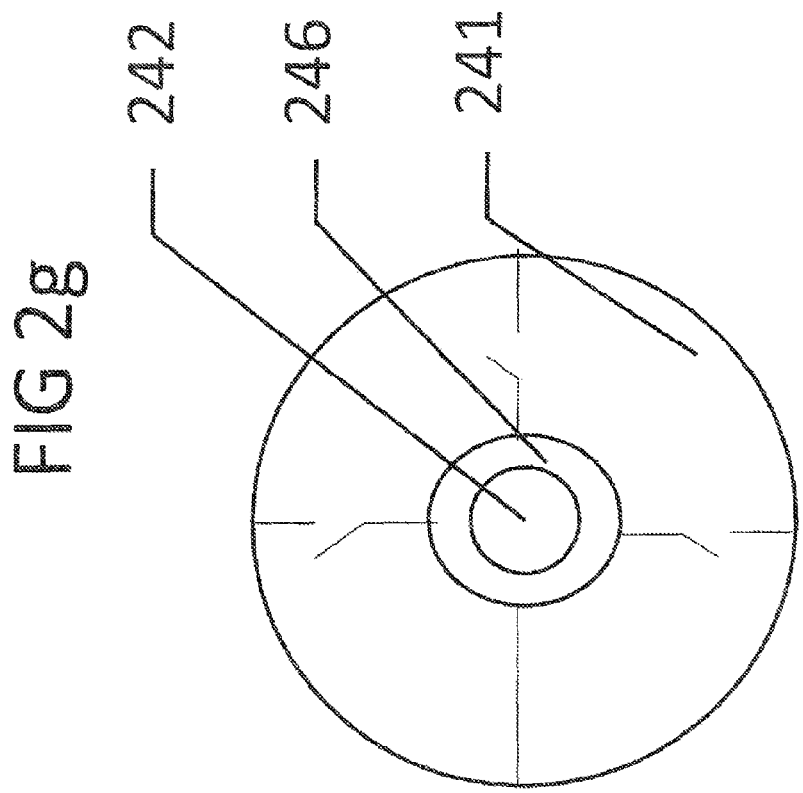

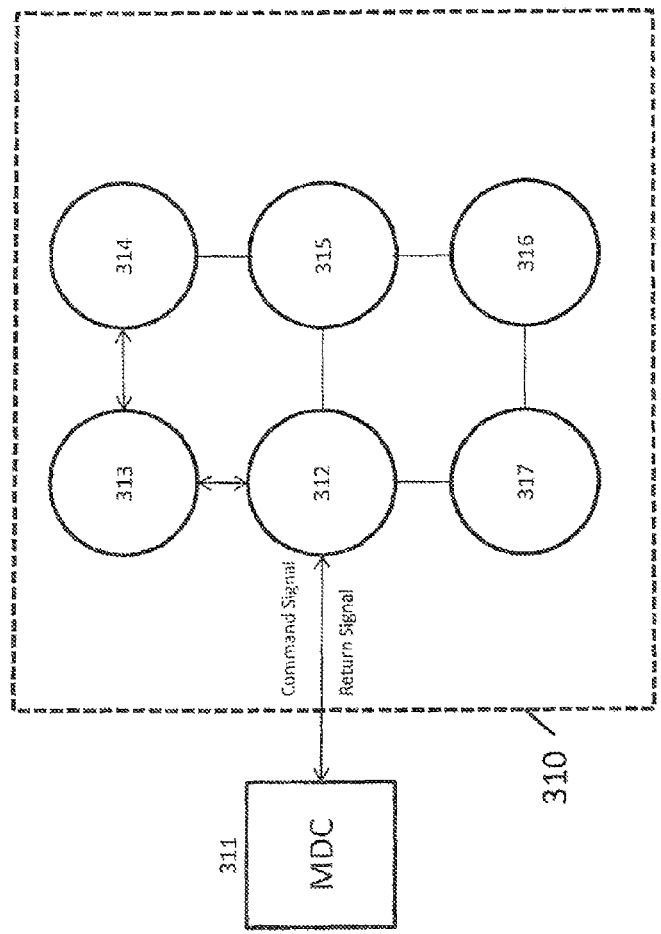

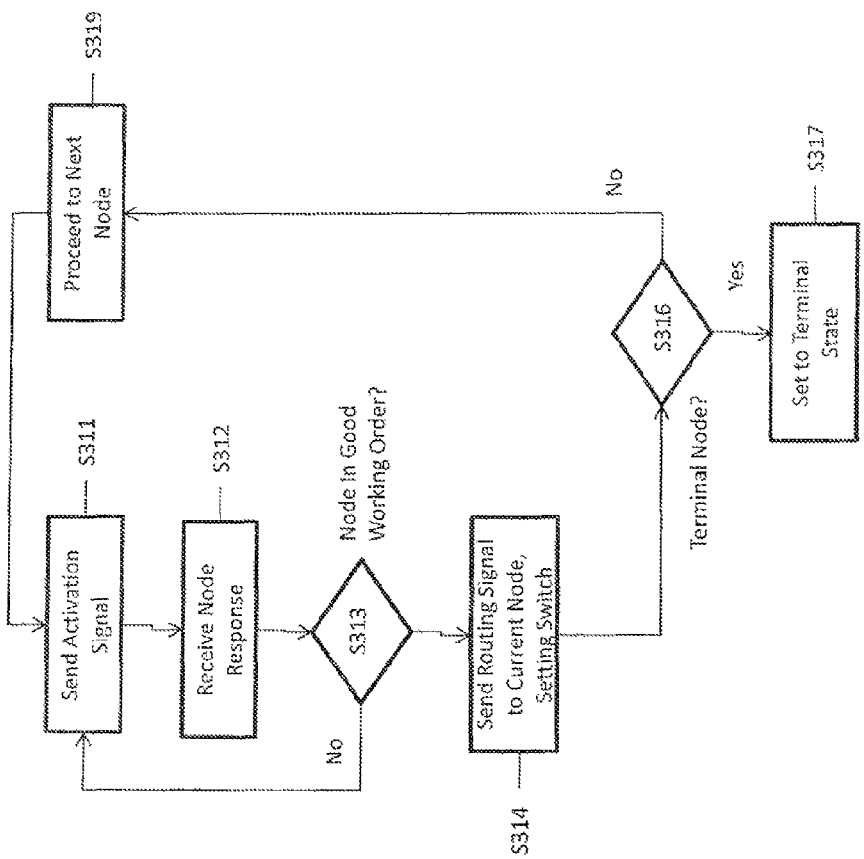

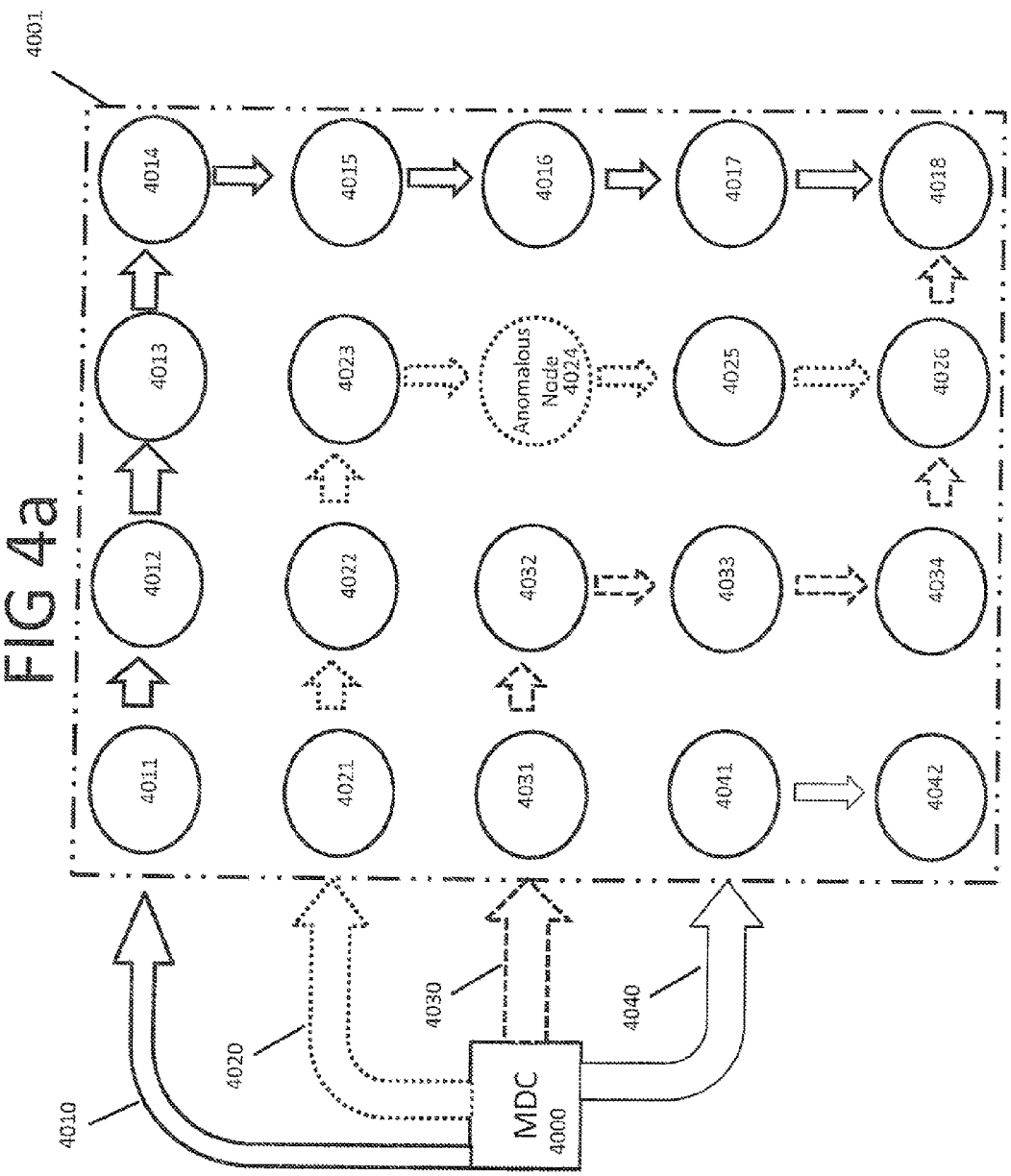

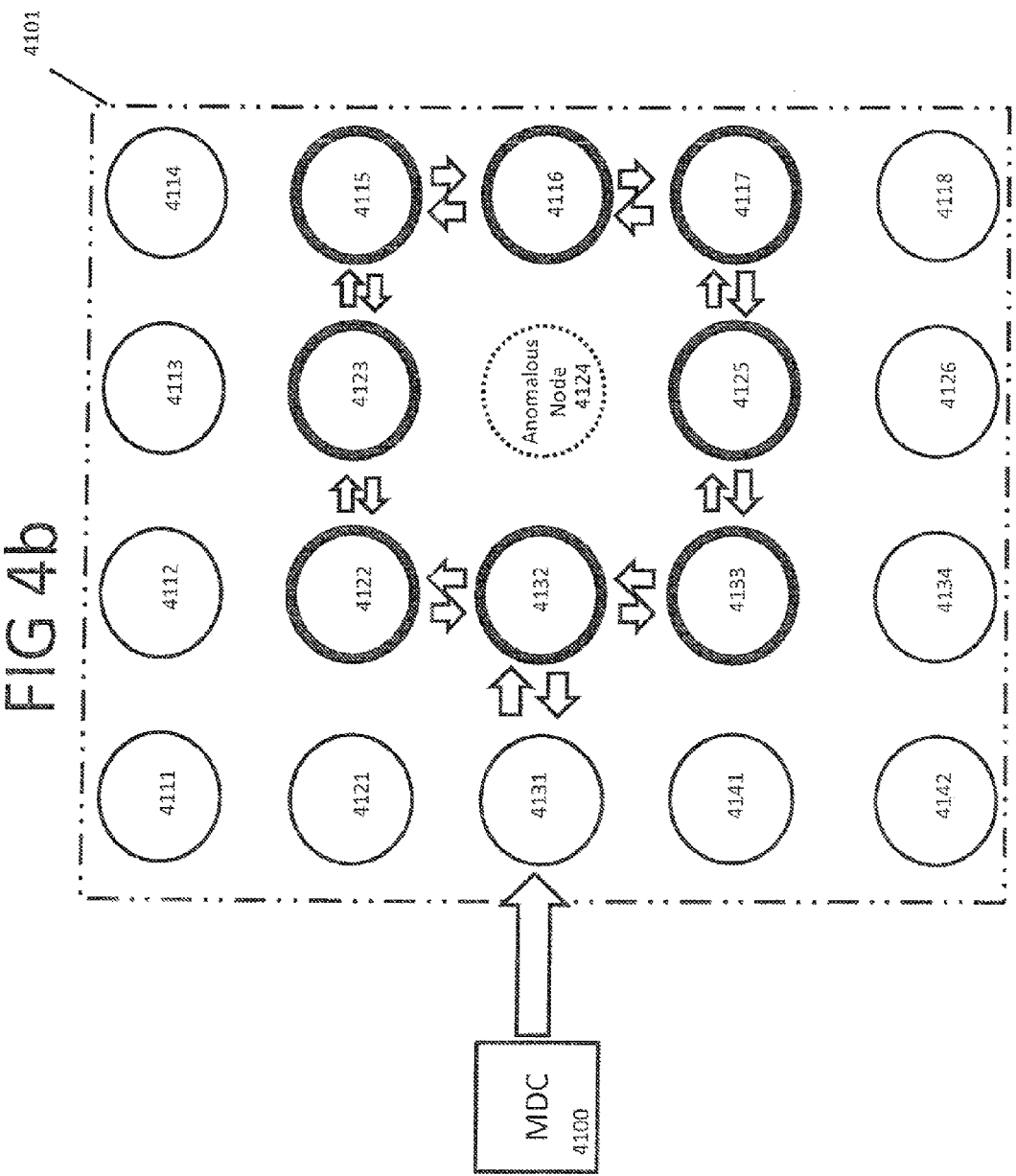

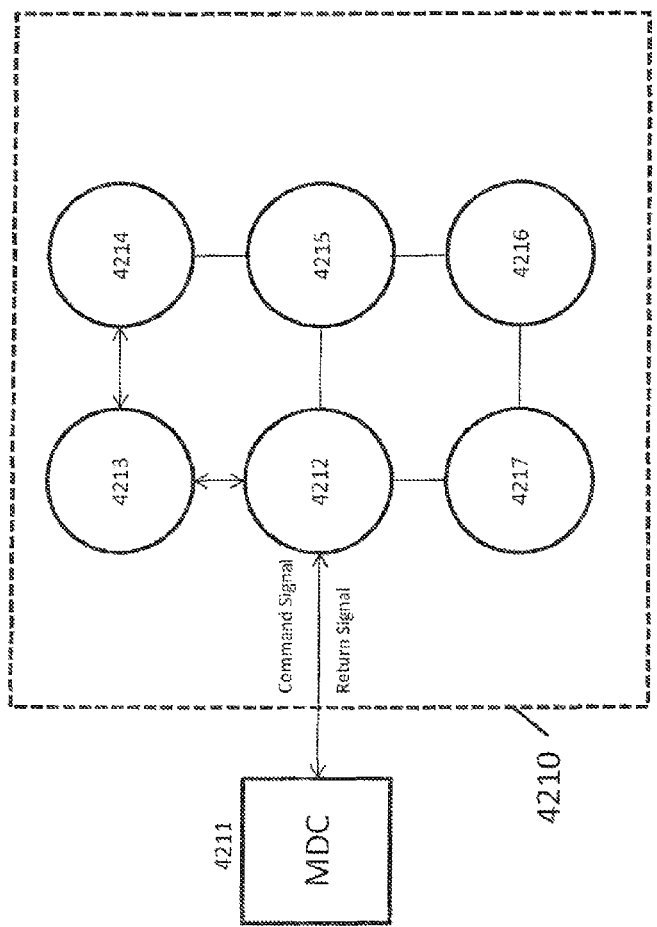

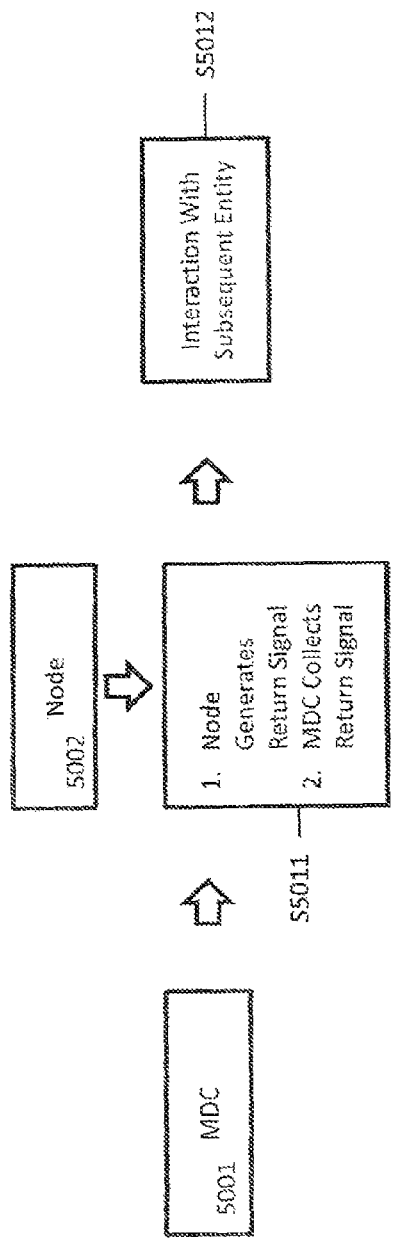

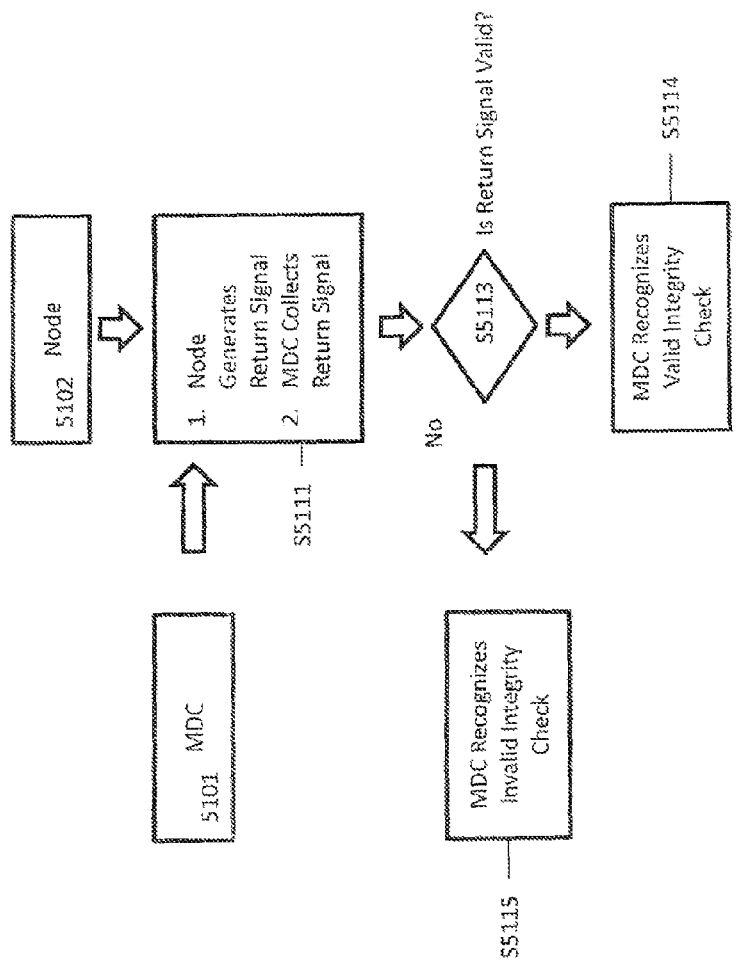

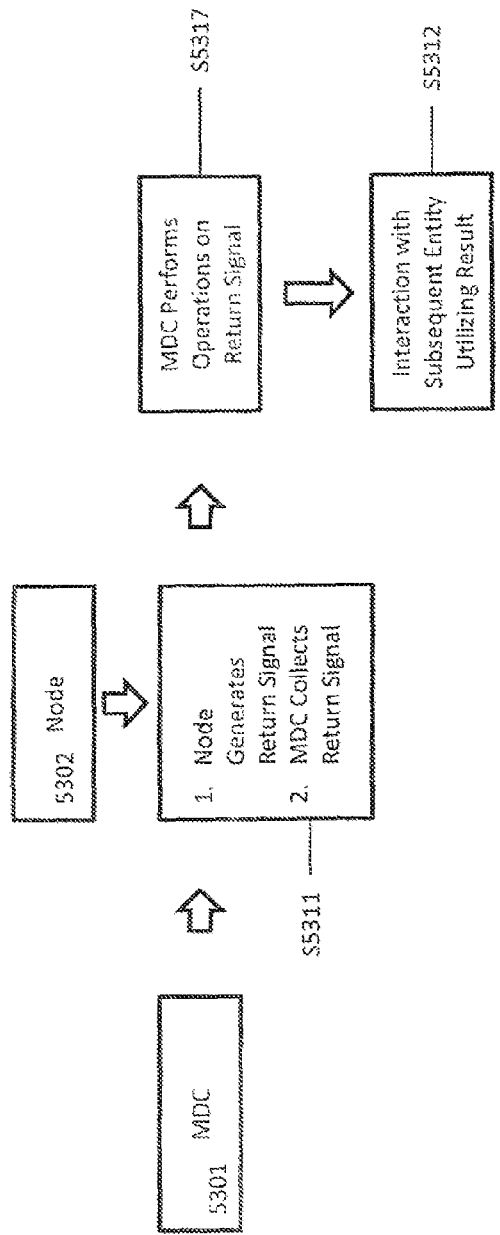

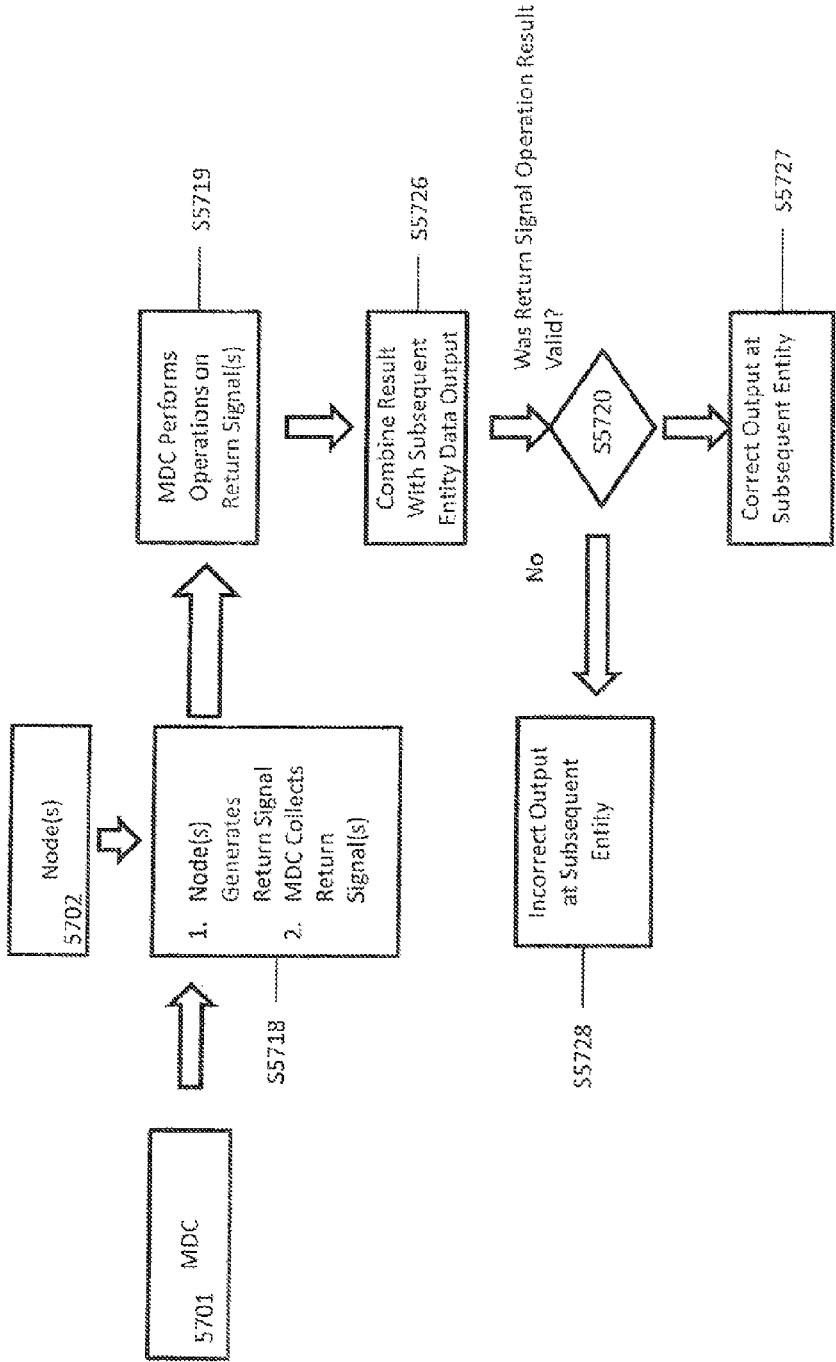

US 8,869,309 B2

DYNAMICALLY RECONFIGURABLE 2D TOPOLOGY COMMUNICATION AND VERIFICATION SCHEME

CROSS REFERENCE TO RELATED APPLICATIONS

This application is the National Phase of PCT/US2012/033320 filed Apr. 12, 2012, which claims priority under 35 U.S.C. 119(e) to U.S. Provisional Application No. 61/475,536 filed Apr. 14, 2011, all of which are hereby expressly incorporated by reference into the present application.

FEDERAL DISCLOSURE

Not applicable

TECHNICAL FIELD

Techniques and solutions discussed herein related in general to hardware-based data encoding and anti-tamper solutions to prevent unauthorized access to and modification of components or information stored in electromagnetic (EM) domains (electronic, magnetic, or optical modules), components of a printed circuit or wiring hoard, or in integrated circuits, optical, magnetic., or other EM devices.

BACKGROUND

Anti-tamper (AT) devices and techniques have long been used to protect and secure proprietary and secret products and information from discovery by either hacking or reverse engineering. AT techniques and reverse engineering techniques constantly develop in response to each other in an ever more complex and intricate interplay of security measures and counter-measures. One particular area where stronger anti-tamper techniques are desirable is in the development of secure, tamper-evident, tamper-sensitive, and tamper-respondent coatings for circuit components and other hardware.

Another area of interest related to anti-tamper techniques is masking, altering, varying, compounding or otherwise obscuring the actual component content, wiring or trace structure and layout of a circuit board, and/or intellectual property associated with the fabrication of an integrated circuit, thereby making it more difficult to unlock and reverse engineer a protected information storage or information processing system.

SUMMARY

Aspects of the present disclosure are directed at providing coatings for tamper prevention, tamper detection, and data security of printed wiring boards, printed circuit boards, integrated circuits, similar EM pathway-based components and any enclosure or volume that is subject to forcible intrusion and/or penetration that might contain the aforementioned items.

A variation of the techniques and solutions discussed herein pertains to a conformal coating having information embedded therein, the coating comprising: an insulating layer disposed on a component; an active layer including a switched network having a plurality of nodes controlled by a master device controller (MDC); wherein a node on the switched network is configured to have dormant, active, and routed states such that the node, upon getting an activation command from the MDC, said node enters the active state, upon getting a signal routing command, the node enters the routed state, and upon getting a de-activation command from the MDC, the node enters the dormant state; wherein the node provides information about itself to the MDC via the switched network in the active state and transmits a signal from the MDC to a subsequent node along a routed signal path in the routed state; wherein the routing command causes an active node to connect to a subsequent node in the network, the subsequent node being identified in the routing command; and where the embedded information includes a measurable property of a node in a signal path in the network.

In some variations, the embedded information includes information indicating whether or not a particular node in the network is in an anomalous state. In some variations, the embedded information includes cryptographic information for accessing data or functions of a component connected to the coating. In some variations, the cryptographic information is a decoding key and the component is an encrypted memory device.

In some variations, the nodes of the coating are connected to underlying coated components. In some variations, a coated component is part of the routed signal path. In some variations, upon entering said routed state, the node becomes a pass-through that routes a subsequent command signal from the MDC to the subsequent node. In some variations, the node is connected to other nodes in a grid pattern by signal conduction paths disposed between the nodes.

In some variations, the MDC includes a measurement unit that measures and records a plurality of signal pathways within the switched network. In some variations, the measurement unit measures and records all possible signal pathways within the switched network. In some variations, the MDC is equipped with a pathway decision logic unit for generating signal paths based on the signal pathway recorded by the measurement unit. In some variations, the measurement unit includes a field programmable gate array (FPGA) and wherein the pathway decision logic includes random sequencer logic. In some variations, the MDC includes a lookup table, said measurement unit recording said signal pathways as information in said lookup table and said pathway decision logic unit generating signal paths based on information recorded in said lookup table.

In some variations, the MDC may directly address any node in the network. In some variations, the MDC can only address nodes by adding them to a routed signal path.

In some variations, a node includes a sensor. In some variations, the coating is applied to a component and the sensor is configured to detect attempts to gain access to or examine the coated component. In some variations, the node includes at least two different sensor types.

In some variations, the node includes a controller portion that controls a connection switch disposed in the node. In some variations, the node includes a transistor group, the transistor group functioning as a sensor, controller, and switch, where the sensor provides sensor information about the transistors in the group. In some variations, the controller includes an electro-magnetic component having a number of states equal to a number of signal pathways in the node. In some variations, the controller includes a first and a second electro-magnetic component, where the first component is configured to connect to an incoming activation signal to establish a signal pathway into the node and, the second component is configured to switch to one of multiple positions in response to a routing signal from the MDC, and where the MDC maintains and stores the state and condition of each node during signal path creation.

In some variations, the node includes a connection switch configured to establish a connection within the network in response to an incoming command signal. In some variations, the node includes a control signal logic unit that detects an incoming control signal on a particular signal path and designates said particular path as incoming and other available signal paths as outgoing.

In some variations, information about a node is received by the MDC for each node activated by the MDC into a signal path, and the received information is represented as at least one bit string.

A variation of the techniques and solutions discussed herein pertains to an apparatus for decoding encoded information stored in a component, the apparatus comprising: a conformal coating disposed on the component, said coating including a switched network, said network having a plurality of nodes and conduction pathways connecting the nodes; a master device controller (MDC) operably connected to said plurality of nodes; the MDC being configured to send a control signal to one or more nodes via the conduction pathways; and the nodes being configured to provide a return signal to the MDC in response to the control signal, the return signal representing a bit string based on a signal path of the control signal through the network; and the bit string being provided to the component as a decoding key for the encoded information.

In some variations, the component includes a plurality of memory portions, each of the plurality of memory portions being associated with a particular node in the switched network. In some variations, the coated component includes a memory portion. In some variations, the control signal is based on a predetermined signal path through the switched network. In some variations, the return signal includes information about a routed signal path through the switched network and the decoding key is generated based on the routed signal. In some variations, the predetermined signal path is associated with a valid decoding key; and the return signal is compared to an expected return signal based on the predetermined signal path to determine if the routed signal path will generate a valid decoding key.

A variation of the techniques and solutions discussed herein pertains to a method of recovering encryption data embedded in a switched network disposed in a conformal coating covering an encrypted component, the network having a plurality of nodes and a master device controller (MDC), the method comprising: storing information about a predetermined network signal path; sending a command signal from the MDC to one or more nodes, the command signal including one or more of an activation command, a routing command, and a de-activation command; and wherein a node on the switched network is configured to have dormant, active, and routed states such that said node, upon getting an activation command from the MDC, said node enters the active state, upon getting a signal routine command, said node enters the routed state, and upon getting a de-activation command from the MDC, said node enters the dormant state; receiving, at the MDC, a response signal that includes information about said one or more nodes and signal conduction pathways between said one or more nodes and the MDC; converting said response signal into a bit string, where said hit string is a decryption key for decrypting the encrypted component.

In some variations, the method includes comparing the response signal to an expected response based on the predetermined network signal path; and only converting said response signal into the bit string when said response signal matches said expected response signal.

In some variations, the bit string represents a valid decryption key only when the response signal matches an expected response signal associated with the predetermined network signal path.

In some variations, the encrypted component is a memory device, and the method includes decrypting the memory device with the decryption key. In some variations, decrypting includes permanently altering data stored in the memory device when the decryption key is not a valid decryption key.

In some variations, the MDC includes a lookup table, and the method further comprises: storing information about a predetermined network signal path as information in the lookup table; sending the command signal based on a routing path generated from the information stored in the lookup table; and converting the response signal into a bit string based on the information stored in the lookup table.

A variation of the techniques and solutions discussed herein pertains to a method of recovering encryption data embedded in a switched network disposed in a conformal coating covering an encrypted component, the network having a plurality of nodes and a master device controller (MDC), the method comprising: storing information about a predetermined network signal path arrangement; measuring a current network signal path arrangement; sending a command signal from the MDC to one or more nodes based on the current network signal path arrangement, the command signal including one or more of an activation command, a routing command, and a de-activation command; and wherein a node on the switched network is configured to have dormant, active, and routed states such that said node, upon getting an activation command from the MDC, said node enters the active state, upon getting a signal routing command, said node enters the routed state, and upon getting a de-activation command from the MDC, said node enters the dormant state; receiving, at the MDC, a response signal that includes information about said one or more nodes and signal conduction pathways between said one or more nodes and the MDC; generating, during said sending, a bit string based on the current network signal path arrangement, where said bit string is a decryption key for decrypting the encrypted component.

In some variations, the bit string represents a valid decryption key only when the current network signal path arrangement matches the predetermined network signal path arrangement. In some variations, the encrypted component is a memory device, and the method further comprises: decrypting the memory device with the decryption key during said receiving.

In further variations, some or all of the method steps or variations thereof may be embodied in programmable devices or as instructions stored in transitory or non-transitory processor-readable memory for execution by one or more processors or data processing devices.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present disclosure will become more hilly understood from the detailed description given hereinbelow and the accompanying drawings which are given by way of illustration only, and thus are not limitative of the present invention, and wherein FIG. 1a depicts a variation of a conformal coating as described herein;

FIG. 1b depicts a variation of a conformal coating as described herein;

FIG. 2a depicts a variation of a coating-based switched network as described herein;

FIG. 2c depicts a variation of a node within a switched network as discussed herein;

FIG. 2d depicts a variation of a node within a switched network as discussed herein;

FIG. 2e depicts a variation of a node within a switched network as discussed herein;

FIG. 2f depicts a variation of a node within a switched network as discussed herein;

FIG. 2g depicts a variation of a node within a switched network as discussed herein;

FIG. 3a depicts a variation of routing within a switched network as discussed herein;

FIG. 3b depicts a variation of a routing technique for monitoring the integrity of nodes on a variation of the switched network as discussed herein;

FIG. 4a depicts a variation of a technique for monitoring the integrity of nodes on a variation of the switched network as discussed herein;

FIG. 4b depicts a variation of a technique for monitoring the integrity of nodes on a variation of the switched network as discussed herein;

FIG. 4c depicts a variation of a hardware based encryption system as discussed herein;

FIG. 5a depicts a variation of a technique for using information from a variation of a switched network to interact with a subsequent entity as described herein;

FIG. 5b depicts a variation of a technique for using information from a variation of a switched network to interact with a subsequent entity as described herein;

FIG. 5d depicts a variation of a technique for using information from a variation of a switched network to interact with a subsequent entity as described herein;

FIG. 5h depicts a variation of a technique for creating and using cryptographic information based measurements or properties of a variation of a switched network as described herein.

Figure 2B:
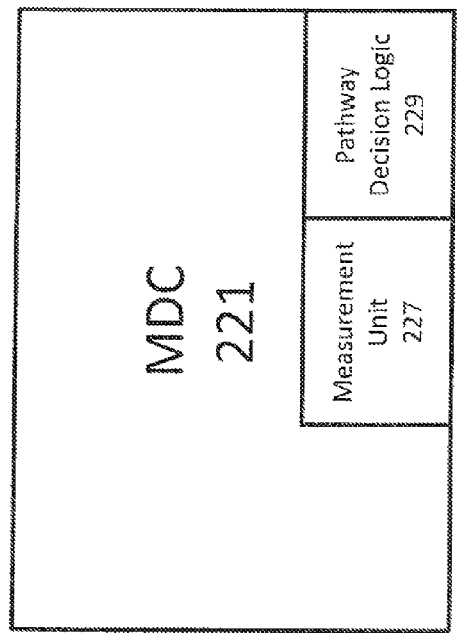
FIG. 2b depicts a variation of a master device controller (MDC) as discussed herein.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the techniques and solutions discussed herein. Instead, the scope of the invention is defined by the appended claims and equivalents thereof.

Techniques and solutions discussed herein pertain to a conformal coating for an electronic or electro-optical component or component group which may include at least an electrically insulating layer disposed onto the component surface and an electrically conductive active layer disposed on top of the insulating layer.

Some variations of the conformal coating may include an elastomeric insulating layer composed of materials such as silicone, elastomer, resin, latex, and/or rubber. Such variations of an insulating layer may be configured, based on the material properties of the layer and the underlying component(s), to be removable such that the underlying components may be accessed for maintenance, repair, or re-configuration.

In some variations, an electrically insulating layer may be deposited as a permanent coating onto a substrate component or component assembly. Such variations may be useful in situations where the components are not meant to be modified or should otherwise he sealed/coated to prevent or restrict access thereto.

Variations of a conductive active layer may include metallized layers/regions including one or more of: ground planes, wire mesh or grid, one or more antenna arrays, frequency-specific external RF-absorbing layers, impedance matching networks, printed or plated conduction pathways, embedded circuit components, switched networks, sensors, optical components, and/or connections to around or backshell points on the underlying component(s) or other nearby ground sources.

Embodiments of solutions and devices discussed herein include systems and method for embedding access or encryption keys or other sensitive or system-specific data, or portions thereof, directly into hardware components such that the keys may only be recovered or generated by an internal test or analysis technique, thereby limiting and controlling access to system, component, or storage devices, or data in system or storage devices covered by or operationally connected to such a coating.

A variation of the coating discussed above is depicted in FIG. 1a. In the variation shown, an insulating layer 102 may be disposed on a substrate (not shown) as either a strippable or non-strippable layer. Such a substrate may include a circuit board, an individual component of a circuit board, or other electrical components. In some variations, the insulating layer 102 is conformal so that it minimally alters the shape and footprint of the substrate (if at all). In some variations, the substrate may be subjected to surface treatment before the insulating layer 102 is applied. Such surface treatment may reduce the amount or level of adhesion between the board and the insulating layer 102, making it easier to strip or remove at a later time. Variations of the surface treatment for the substrate may include dips, sprays, plasma treatments, etching, ashing and other known surface modification techniques.

In some variations, an electrically insulating layer 102 may be deposited as a permanent coating onto the substrate. Such variations may be useful in situations where the components are not meant to be modified or should otherwise be sealed/coated to prevent or restrict access thereto.

An active layer 101 may then be deposited onto the insulating layer 102. In some variations, an active layer 101 may be applied such that it adheres strongly to a permanent insulating layer 102, creating a conformal, non-strippable coating. Such a variation may be useful for size or weight-limited components where modification or maintenance are not important. In other variation, an active layer 101 may be applied so that it is strippable from or with the insulating layer 102.

In some variations, the active layer 101 may include a switched network, including active components and connectivity paths. Some variations of such a switched network may include one or more nodes controlled by a master device controller, and signal paths between the nodes. Such signal paths may be selectively accessed or activated either by routing logic and/or components in a node, or in a signal path, or some combination thereof. In some variations, the signal paths may be created using techniques such as material deposition: screen printing, lithography, etching, plating, sputtering, or combinations thereof.

In some variations, a switched network may include components as part of or in addition to the network nodes. Variations of components in the switched network may include antennas, inductors, capacitors, resistors, transistors, transistor arrays, operational amplifiers, semiconductor devices, switches, switched arrays, multi-layered component assemblies, resonators, various active and/or passive sensors, processors, memory devices, electro-mechanical components, lasers, ultrasonic emitters, and impedance matching devices. Discrete components such as flip-flops, shift registers, microprocessors, field programmable gate arrays (FPGAs), or logic gates may also be included in or otherwise connected into the switched network. Attempts to access components of the network or devices connected to and/or covered by a coating having such a switched network therein may be detected through the network components or combinations thereof. In some variations, the components of the switched network may be connected to each-other and/or to some or all of the devices connected to and/or covered by the coating to create a logic device capable of decision-making.

FIG. 1B shows a variation of the conformal coating where an insulating layer 112 may be disposed on a substrate (not shown) as either a strippable or non-strippable layer, and where a ground plane 113 may he disposed on the insulating layer. The ground plane 113 may be disposed between the insulating layer 112 and the active layer 111 to protect components on the substrate from interference or radiation generated or used by components in the active later 111. In other variations, the ground plane 113 may have some other purpose instead, or in addition to, acting as a ground plane. It may provide CTE matching, shock absorption, environmental protection (waterproofing/chemical resistance, etc), or heat regulation. In yet further variations, the ground plane 113 may be omitted entirely or otherwise have its functions integrated into the insulating layer 112.

In some variations, another around plane 114 may be disposed on the active layer 111. Such a ground plane layer 114 may include a metallization coating, wire mesh, networks of conduction paths, or other suitable materials to provide a ground plane shielding function. In some variations, this ground plane 114 may be omitted or may be included as part of a capping layer 115. Variations of a capping layer 115 may be used to provide the coating and/or coated device some measure of protection from environmental factors or wear/use damage. Such a capping layer 115 may include silicone, EPDM rubber, polystyrene, resin, or a heavier metallization coating or some combination thereof. In some variations, the ground plane 114 may be also serve as a capping layer.

FIG. 2a shows a variation of a coating-based switched network 210 having a plurality of nodes, 212, 213, 214, 215, 216, controlled by a master device controller (MDC) 211. In some variations, the MDC 211 may be a network controller switch providing routing control of the networked signaling.

In some variations, the MDC 211 is intelligent, able to route signaling in static or real-time using prescribed, programmed, or random routing. Some variations of an MDC 211 may include a semiconductor device driving electrical and/or optical networks. The MDC 211 can provide direction control to the network switches. Each network switch may be configured to directly or indirectly receive commands from the MDC 211 and select input and output routing across multiple network paths.

In one variation, the switched network 210 may include one or more printed circuits or other electronic components or component arrays. In a further variation, the switched network 210 may include one or more semiconductor devices. In some variations, one or more nodes 213, 214, 212, 215, 217, 216 in the network 210 may include one or more sensors and/or memory units. In some variations, one or more nodes 213, 214, 212, 215, 217, 216 may include a group of flip-flop logic devices, which may have their state read and set such that they provides routing to one or more other nodes in the network 210.

The nodes in the network 210 may be connected to other nodes via one or more conduction pathways 218. Although depicted in FIG. 2a as a grid, variations of conduction pathway arrangements may include, but are not limited to, rectangular, triangular, or other polygonal grids/meshes, radial/spoke patterns, branching trees, spirals, linked concentric rings, ellipses, or polygons, and combinations/hybrids of the foregoing. A conduction pathway 218 may be made of an appropriate material based on a selected signal transmission paradigm for the network 210. In a network that communicates with electro-magnetic or radio-frequency signals, a conduction pathway 218 may include an electrically conductive path 218 between two nodes 217 216 or empty space/dielectric material disposed between antennas or inductors. In a network that communicates using optical signals, the conductive path 218 between nodes may include fiber-optic material or empty space to provide lines of sight for optical components. Other variations of conductive paths 218 may be selected based on particular properties of the network 210 and signals transmitted therein. Some variations may include RF or EM waveguides and/or channels/gaps for sonic signals.

A node 212 in the network 210 can be configured to enter one of several states. Such node states may be controlled or otherwise varied based on commands from the MDC 211. In some variations, the nodes 213, 212, 217, 214, 215, 216 may each be configured to vary between dormant, active, and routed states.

In one variation, a command signal from the MDC 211 may cause a node 212 in the network 210 to transition from a dormant state to an active state. A node in a dormant state may be a node that has active components which are in an unpowered or otherwise inactive condition, a node that is not connected to any other nodes, or a node that is otherwise not providing information to other nodes and/or to the MDC. A node the active state may be configured to send information about itself to the MDC 211 via one or more conduction pathways 218 in the switched network 210. The information sent from the node 212 to the MDC 211 may include information collected by a sensor and/or stored in a memory unit at the node, or may include information regarding the integrity of data stored at a memory device, or, in some variations, information regarding the integrity or operability of the node itself and/or components thereof.

A routing command may cause a node 212 in the network 210 to enter a routed state, in which it may connect to a subsequent node 213 in in the network 210. In some variations, a node may need to he in the active state before it can be routed. In other variations, a dormant or passive node may be routed without placing the node in the active state. In yet further variations, a node may be activated and routed with a single command signal. In one such variation, the node may become active, transmit information about itself to the MDC, and then enter a routed state based on routing information included in the activation command signal.

In some variations, a node in the routed state may become a pass-through that routes a subsequent command signal from the MDC 211 to the subsequent node 213. In some variations, a subsequent node may be identified in the routing command. In other variations, a routing command may direct a node to make one or more connections to subsequent or adjacent nodes based on available connections at the node. In some such variations, an awareness of subsequent/adjacent nodes or adjacent node states may not be required. In other variations, a number of available connections at the node may be standardized such that each node has, for instance, three possible outgoing connections (the data command accepting connection being an incoming and/or I/O connection). In some such variations, a node may inform the MDC 211 of whether a routing command was successful. A routing command attempting to activate a terminal or terminated or otherwise unsuccessful connection, for example, may result in a particular signal sent back to the MDC indicating that routing could not be performed. A terminal or terminated connection may include a connection point on a node that is not associated with a conduction path. For example, a node 217 having only two conduction paths connected thereto may nonetheless have more than two possible connection points. In other variations, routing to a damaged, compromised, or otherwise inaccessible node may cause the routed node to return an error or failure indicator to the MDC.

In some variations, the command structure may be independent of the network (i.e. one where the MDC can access the individual nodes without having to route through intervening nodes), or may share network paths. In some variations of a command structure, routing commands may be executed without feedback or acknowledgement from the switch. In other variations, a feedback mechanism may be provided to confirm that routing is as expected. A query/answer protocol may be used for routing confirmation. In some variations, routing may be accomplished in a manner similar to that used on Ethernet or Ethernet-type networks, where feedback mechanisms may indicate switch failures or conductive path problems.

In some variations, routing in a node may be accomplished by one or more switches (logical or physical) in a node that connect or activate one or more connections between the node and conduction paths leading to adjacent nodes. Variations of such switches are discussed and depicted in FIGS. 2e-2g.

A de-activation command may cause an active or routed a node 212 in the network 210 to enter a dormant state, in which active portions thereof may become de-activated, the node disconnect existing routing connection, and/or the node may wait for a further command from the MDC 211. In some variations, a de-activation command may be designated as a broadcast command intended to affect all nodes in the network 210. In one variation of a broadcast de-activation command, the command may be propagated by each node in the network 210 through every available connection to reach all nodes on the network. Such a variation may temporarily cause each node in the network to connect to each adjacent node to propagate the command. Such a variation of a broadcast command may also be used for node activation commands.

In other variations of a de-activation command may be generated and/or emitted from the MDC 211 such that the command is propagated by nodes in a routed signal pathway to de-activate each node in the pathway. In one such variation, a de-activation command may begin a reverse cascade with a node at the end of the routed pathway shutting itself down and then instructing the previous node in the pathway to shut down, and so on. In another variation, such a path-based de-activation command may cause the first node in the pathway to forward the de-activation command to a subsequent node and then shut down, thereby immediately severing the routed signal path from the MDC 211 before shutdown of all nodes in the path is complete. In yet a further variation, such a path-based de-activation command may cause all the nodes in the routed pathway to simultaneously enter a dormant or de-activated state.

In a further variation, the MDC 211 may also send command signals that determine, read, or otherwise interrogate a state of a node and/or components therein. In one such variation, the MDC 211 may direct a node 214 or components in the node to activate, de-activate, or otherwise change state. In variations where a node may include an active sensor, the MDC 211 may send a command to specifically activate, de-activate, or read a detection output of that sensor. In variations where a node may include a memory device, the MDC 211 may send a command to read, write, or clear the memory. In variations where a node may include a passive sensor, the MDC 211 may send a command to measure or otherwise read a detection result of the passive sensor. In variations where a node may include a logic device or processor, the MDC 211 may send one or more commands to activate, de-activate, or perform computations/decisions on the logic device or processor. In some such variations a range of predetermined computations may be available on the processor or via a memory connected to the processor. In other variations the MDC may fully or partially transmit instructions for specific computations to the processor. In yet further variations, a node may include one or more of any or all of the above components or combinations thereof, and the MDC 211 may address such components collectively or individually using activation, de-activation, read-out, or other commands as necessary.

In one variation, an MDC 211 may communicate pictured particular node 214. One variation of a signal path may require passage of command signals through predecessor nodes 212 213 to communicate with the particular node 214. In such a variation, the MDC 211 may first send a routing command to a first node 212 in a signal path indicating a subsequent node 213 as the routing destination node. The MDC 211 may then, upon confirming or otherwise receiving indication that routing was successful, either interrogate the node 213 to ensure it is in a state suitable for routing, or may directly send a routing command to the node 213 through the previous node 212 specifying the particular node 214 as the destination node. The MDC 211 may then send commands to the particular node 214 through both the routed nodes 212 213 in the signal path. Commands from the MDC 211 to the particular node 214 may include activation commands, which may result in the node 214 returning specific information to the MDC 211, another routing command, which may cause the node 214 to route to an adjacent node 215, or specific commands directed at one or more components in the node 214 as discussed above.

In the embodiment discussed above, a serial communication protocol may be used where at any point in the signal path, only the last node in the path responds to connectivity commands. Other variations may use a parallel protocol to traverse the network. Such a protocol may be useful in variations where a node 212 may be routed to connect to multiple other nodes 213 217 to create a branching signal path.

In some variations, an MDC may include a measurement unit or device that measures and records one or more signal pathways within the switched network. A variation of such an MDC is shown in FIG. 2b. In one variation, the measurement unit 227 of the MDC 222 may record a signal path as it is being created by routing commands issued from the MDC 221. In some variations, a measurement unit may measure and/or record all routing commands issued by the MDC 221. In other variations, successful routing commands may be distinguished from unsuccessful routing commands. In yet other variations, unsuccessful routing commands may be ignored by the measurement unit 227. The measurement unit 227 may measure and record a plurality of signal pathways within the switched network. In some variations, an MDC 221 may create or maintain multiple active signal paths within a switched network. In some variations such signal paths may include overlapping nodes (i.e. a node may be part of two different signal paths). In other variations, one or more signal paths recorded by the measurement unit 227 may be branching paths where a single node has two or more outgoing routing connections.

In some variations, the measurement unit 227 may be en electronic device used to record outgoing network commands. In query/answer variations, the measurement unit may also record an answer or response from a node receiving the command. Variations of a measurement unit 227 may include a semiconductor device such as a processor or a controller. In some variations, the measurement unit 227 may be equipped with memory and/or configured to work with memory portions of the MDC 221 or with a memory connected to or otherwise accessible by the measurement unit 227 or the MDC 221. In some variations the measurement unit 227 may be an internal, integral component of the MDC 221 or may he a logical portion of an overall MDC 221 processing structure. In other variations, the measurement unit 227 may be a separate and/or external component operably connected or otherwise Communicating with the MDC 221.

some variations, an MDC 221 may include a semiconductor processor or sequencer such as an FPGA. The measurement unit may similarly include a processor or sequencer such as an FPGA. In some variations, a measurement unit may be external to the MDC. In such variations, the measurement unit may be closely coupled to the MDC, preferably with cryptographic coupling, to prevent or otherwise forestall simple tamper and defeat of the mechanism.

In some variations, the measurement unit 227 may measure the entire switched network to enable generation of a network map showing all possible signal paths in the network. As the MDC 221 establishes a signal path through the network, it can be determined, from the network map, whether a routing or connection attempt is valid and also how long a signal should take to travel alone its assigned course and return to the MDC 221. In such a variation, any deviations from the signal path (caused, for instance, by unexpected sensor inputs, defective/damaged sensors, and/or breaks in conduction paths), may be identified by the MDC 221 as delays or deviations from the known map. In some such variations, the measurement unit may be an external unit that operates once on the network and provides network map information to the MDC. By removing subsequent re-mapping capability from the MDC, it may he possible to prevent "re-mapping" of a damaged or compromised network to create a false impression of proper network operation. In some variations, this may be realized by pre-venting the MDC 221 from sequencing or altering paths as part of its programming or sequencing.

In some such variations, an initially detected mapping may remain fixed or otherwise set on the broken or damaged path routing. In such variations, by analyzing the data coming from the node and comparing that against an expected data value associated with the respective pathway decision signal, the MDC 221 can determine if the pathway decision signal was properly routed/executed, and also if the node is functioning properly. By measuring and recording different signal paths, the MDC 221 may be able to develop an awareness of the extent and configuration of the switched network, and therefore some or all of the available signal pathways for traversing the switched network. In a further variant of the MDC 221, the MDC 221 may be equipped with a pathway decision logic unit 229 used to produce signal pathways, the algorithm being predicated on the measurement and awareness of the extent and configuration of the switched network.

Variations of a pathway decision logic unit 229 may be realized as logical sub-section or firmware sequencing associated with or included in the MDC 221. In some variations, a pathway decision logic unit 229 may include a random or pseudo-random sequencer logic designed to cover some or all path permutations in an unpredictable manner. Such a variation may employ a random or pseudo-random numerical sequence into a look-up table of possible routings. Variations of such a lookup table may include or output switch or routing control logic messages or signals. Some variations of a lookup table may provide parameters used to measure security checks and/or expected node responses. In some variations, the pathway decision logic unit 229 may be an integral portion of the MDC 221. In other variations, the pathway decision logic unit may be a separate unit or device closely coupled to the MDC, preferably with cryptographic coupling.

In some variations, the MDC or components thereof or associated therewith may receive sensor data from sensors included in or connected to the nodes. FIG. 2c shows a variation of a node 201 within the switched network which includes a sensor 202. In some variations, the sensor 202 can be configured to sense the physical environment of the node, including but not limited to one or more of light, sound, temperature, and vibration, among other environmental factors. Such a sensor may be active, passive, or operable in active or passive modes. An active sensor may include an imaging device or an RF detector or an echo-location device. A passive sensor may include a radiation detector, a pressure or deflection sensor, or similar device. In some variations, a sensor may include piezo-electric film or components that change their signal-response properties based on physical pressure or deformation. Such sensors may passively detect the environment but may not provide such detection information unless/until actively interrogated by the MDC or other network/node monitoring component(s). In other variations, a sensor may include a passive radiation detector that, when triggered, causes the sensor to activate and transmit detection information to the MDC or other network/node monitoring components.

In a further variation, the sensor 202 may be configured to detect attempts to gain access or examine the coated device or portions thereof. Such variations may be configured such that a detected tamper, intrusion, or examination attempt renders the coated device or portions thereof non-operational. In some variations, this may be caused by a detection result at a node altering or destroying a capacity to recover system data stored in a signal path or at a node or node series, where such system data may include activation codes or data encryption/decryption keys necessary for proper operation of or access to the coated device or device portions. Such variations may employ hardware-based data encoding techniques of the types discussed in U.S. Pat. No. 8,127,151, the entire contents of which are hereby incorporated by reference.

The network, in some or all of the embodiments discussed herein, may have embedded therein one or more portions of system or encoding data. Such data may be embedded in one or more network signal paths, sensor outputs, data stored at nodes, or variations and combinations thereof. The MDC or other network control or monitoring component may poll or otherwise examine the network in order to generate or recover this system or encoding data. Variations of such data may include data encryption keys required to access encoded data in a coated device. Such encoded data may be used internally within the device and/or accessed externally. Variations of such data may also include system commands or command sequences required to activate, de-activate, or otherwise properly operate or control a coated device or portions thereof. A change in structure or operation of the network may alter or destroy the data embedded in the physical structure thereof, rendering a coated device or portion thereof inoperable or data therein inaccessible.

In another variation, the sensor 202 may be configured to detect anomalous data traffic on the coated device or portions thereof. In such a variation, the sensor 202 may be configured to detect anomalous system commands entering or leaving a component operationally connected to or monitored by the switched network. In some such variations, the sensor may be a passive device meant to simply read and relay command signals coming into the device or device portion. For example, a command to exceed or change a particular clock speed or issue control or configuration commands to some or all device components may be detected by the sensor. In some variations, such a detection may trigger a change in the structure or operation of the network.

In a still further variation, the sensor 202 may have an active or aggressive state that may require an additional power source to be activated. The aggressive state of a sensor 202, in such a variation, may be more sensitive than a sensor 202 in a passive state. In other variations, a sensor may perform detection in active and passive modes, with the aggressive state being the active sensor detection mode. Such variations may include, for example, an RFID tag or similar device having active and passive detection capabilities. In one example, a temperature sensor may detect temperature passively through, for instance, deflection of a bi-metal portion or actively through, for instance, infra-red detection of immediate surroundings.

Sensors 202 of any type may have an aggressive state. For example, a sensor 202 configured to sense vibration may include a microphone or microphone-like portion that translates detected vibrations into electrical signals or a device like a strain gauge configured to change its signal transmission properties based on changes in its deflection. Such a sensor may also include an amplification unit which, in the aggressive state, may amplify (and, in some cases, filter and normalize) the detected vibrations for increased sensitivity. Similarly, a sensor 202 configured to detect anomalous system commands on the underlying component may, in an aggressive state, change from simply detecting command information to performing some amount of signal alteration or filtering. For example, a command-monitoring sensor may include an antenna that, in an aggressive mode, generates an amount of RF interference sufficient to scramble any commands coming into the monitored device or device portion. In some variations, such sensors could he configured to perform levels of packet monitoring and packet filtering on data lines or data processing devices. Some variations may allow for passive, undetectable monitoring of a data line and automatic initiation of countermeasures based on predetermined threshold conditions that do not require a-prior knowledge of a root source or cause of invalid or otherwise unacceptable data signals on the line.

FIG. 2*d* shows a variation of a node 211 where the node 211 includes multiple sensors 212, 214, in the embodiment shown, the node 211 includes two sensors: sensor A 212 and sensor B 214. In some variations, more than two sensor may be included in a node. Some variations may include sensor arrays or sub-arrays. In some variations, the multiple sensors include at least two different sensor types. For example, in one variation, one sensor 212 may sense temperature, while another sensor 214 detects pressure. In another variation, each node may include two or more photo-detectors attuned to a desired electro-optical frequency range (visible, IR, millimeter wave, UV, x-ray, etc.) or combinations thereof. The switched network may, in such a variation, include a capability to operate as a variable-size, variable-resolution imaging array. In yet another variation, a node may include at least one passive sensor, such as a pressure sensor or certain types of radiation detector, and at least one active sensor, such as a photo-detector or an RF or data monitoring sensor. Although depicted in this variation as having only sensors, a node in the network may also be equipped with routing switches or similar connection capability to connect to and disconnect from other nodes in the network. A variation of such a node is shown in FIG. 2*e*.

FIG. 2*e* shows a variation of a node 221 where the node 221 includes a controller portion 223 that controls connection switches 225 disposed in the node 221. The controller 223 in the variation shown opens or closes one or more connection switches 225 in response to routing commands or activation/de-activation commands. In some variations, the controller 223 may include a transistor group, where the transistor group functions as the sensor 222, controller 223, and connection switch 225. In such a variation, the "sensor" aspect 222 may provides information about the transistors in the group. Damage to or interference with the operation of the transistors will alter a signal response of the transistor group, thereby providing an indication of a tamper attempt or otherwise preventing recovery of hardware-encoded system information.

In some variations, the controller 223 may include an electro-magnetic component having a number of states equal to a number of signal pathways in the node 221. In such a variation, a command to enter into a particular state may cause the electro-magnetic component to open or close one or more data connections to adjacent nodes, depending on the particular state or state transition. In another variation, the controller 223 may include an incoming connection control portion that is configured to connect to an incoming activation signal to establish a signal pathway into the node 221, and an outgoing connection control portion configured to create or terminate one or more outgoing data connections to adjacent nodes in response to a routing signal from the MDC.

Although depicted as electro-mechanical switches, the data connection points on a node may be embodied as purely electronic switches, transistors, diodes, shutters (in the case of optical signal transmission), logic gates, RF transmitters, and variations or combinations thereof. Although depicted as having four data connection points, the node 221 may, in some variations, have more or fewer connection points. In some variations, a node may have an arbitrary number of possible connection points, with the actual number governed only by the number of signal paths entering or leaving the node. In other variations, a node may have more switches or switchable/mutable states than it has available signal paths. Such variations may occur, for example, at corners of a network grid. In some variations, the incoming connection control portion and outgoing connection control potion may be aspects of the same device or device portion in the node. In other variations, each may be a separate device.

In a further variation, the controller 223 may include a local Ring Oscillator Clock for sending responses and designating the node 221 as an endpoint if no routing configuration is present. In some variations, the MDC may maintain and store the state and condition of each node 201 during signal path creation.

FIG. 2f shows a variation of a node 231 where the node 231 includes a connection point 235 configured to establish a connection with another node in the network in response to an incoming signal 239. In such a variation, the connection point 235 may include or may be monitored by an incoming connection monitoring portion, which may be a hardware or software device or combination thereof. The incoming connection may be detected and evaluated, in such a variation, before connection between the nodes is established. In other variations, each data connection point on a node may include a basic logic or hardware configuration (or combination thereof) to automatically accept an incoming signal from a predecessor node in the network.

In a further variation, a node 231 may includes a control signal logic unit that detects an incoming signal 239 on a particular path and designates that path as incoming and other available signal paths as outgoing. In such variations, the switch 235 or node state or controller state associated with an incoming signal on that signal path may be reserved or otherwise prevented from use as an outgoing signal routine switch, connection, or state. In some variations, such reservation and control may occur at the MDC. In other variations, such reservation and control may occur at the node 231. In further variations, such a reservation and control process or sequence may be accomplished by a combination of node and MDC operation and signaling.

FIG. 2g shows a variation of a node 241 where the node 241 includes a sensor 242 and a memory device 246. In some variations, a node 241 may include only a memory device 246 or multiple memory devices. In some variations, the memory device may act as a sensor. In one such variation, the memory device may be a volatile memory whose contents are erased when the coating or coated device are turned off. In other variations, the memory device may be volatile or non-volatile, and, in some cases, may include optical, biological, or mechanical aspects. The memory device may store information collected by a sensor in some variations. In other variations, the memory device may be monitored by the sensor. In some variations, the coating may be configured to routinely clear or reset any memory devices in the network and read their states. In such variations, the states of some or all of the cleared or reset memory devices (such as power-cycled volatile memory) may be compared to an expected profile or statistical distribution of memory device states to determine whether the coating has been compromised or to recover data embedded in the hardware configuration of the coating.

A method of routing within a switched network included in a conformal coating is shown in FIG. 3a. FIG. 3b displays a flowchart that describes the method. In the variation shown in FIG. 3b, a routing sequence may begin by the MDC 311 sending a command signal S311 to a node 312 in the network 310. The command signal S311 may cause the node 312 to respond or otherwise communicate, via a return signal, its current state to an MDC 311, which receives the response S312. The MDC 311 may then evaluate the node response to determine if the node is in good working order and/or not in an anomalous condition S313. If the node indicates that it is not in good working order or otherwise in an unexpected or anomalous state, the MDC may terminate the routing sequence, provide an indication of node failure to an underlying component or a downstream monitoring system, or may attempt to activate a different node 317 in the network 310 by sending another command or activation signal S311 to that node 317. As will be described in further detail, anomalous results can be further utilized in separate variations of the routing process. If the node response indicates that the node is in good working order, the MDC 311 proceeds to the next node 313 by sending a routing signal S314 to the current node 312. The routing signal sets a connection state of one or more outgoing data connection points in the node 312. If a terminal node 314 is reached S316, the MDC 311 sends a command signal S317 to the node 314, setting the node 314 into a terminal state such that no further signal path propagation is possible S317. If a terminal node 314 has not yet been reached S316, the MDC 311 may proceed to the next node S319 and send an activation or command signal S311 to that node 313, followed by an operational state check S312, S313 and routing S314 to the next node.

In one variation, the terminal node 314 may be predetermined or otherwise selected in advance. In some variations, this may be realized by external inputs or by hardcoding a switched network 310 layout into the MDC 311 or other associated components. In such a variation, the network layout of the whole network 310, including nodes 312, 313, 314, 314, 316, and 317, may be loaded, predetermined, measured, or hardcoded into the MDC. In another variations, the terminal node 314 may be identified or determined through a network analysis techniques such as a time-domain reflectometry (TDR) analysis of the switched network during initialization or during path routing. In yet another variations, the MDC 311 may receive a node response signal after the routing signal 5314 has been acted on by the node 314, indicating that the routing signal terminated at the same node 314 as previously routed. In some variations, such a signal may indicate an anomalous or un-routable node. In other variations, a node may return a distinct terminal status signal indicating that it is it good working order and cannot complete the routing command because it has no routable connections remaining or because it is otherwise established as a terminal node.

In one variation, a return signal may be generated by the node 312 without an external prompt by the MDC 311 via a command signal. In such a variation, a node 312 may include an internal clock or other circuitry that prompts the node to report or otherwise indicate to the MDC 312 whether it is anomalous and/or in good working order. In other variations, node integrity is regularly checked or otherwise monitored network-wide and/or in selected or predetermined network portions or node groups by scheduled system checks or self-diagnostic operations.

FIG. 4a depicts a variation of a method for monitoring the integrity of nodes on a switched network 4001. The MDC 4000 may assign or establish signal paths, 4010, 4020, 4030, and 4040 at a particular frequency such that all nodes in the network 4001 are addressed within a certain time by the MDC 4000. Signal path 4010 addresses nodes 4011, 4012, 4013, 4014, 4015, 4016, 4017, and 4018. Signal path 4020 addresses nodes 4023, 4022, 4023, anomalous node 4024, 4025, and 4026. Signal path 4030 addresses nodes 4031, 4032, 4033, 4034, 4026, and 4018. Signal path 4040 addresses nodes 4041, and 4042. In one variation, the MDC 4000 may establish or assign signal paths in a sequential order, where each node is addressed once. In a further variation, the MDC 4000 may generate signal paths in parallel, where a node may be addressed through more than one signal path. In a still further variation, signal paths may be assigned or established in an ad hoc or randomized manner. In some such variations, a node may be included in multiple signal paths, which may be fully or partially overlapping. In yet further variations, different signal paths may include different forms or methods of integrity checking. Not pictured in FIG. 4a are the return paths of the node responses, providing return signals which provide information about the integrity of the nodes in node group 4001. As shown by the arrows of different line dashing, each node in node group 4001 is addressed by the MDC 4000 at least one time, within a certain period of time, with some nodes being addressed by more than one signal path. The anomalous node 4024, in this example addressed by signal path 4020, returns an anomalous return signal, before then routing the signal path to the next node 4025.

In one variation, an anomalous node may not emit a return signal to the MDC 4000. In another variation, an anomalous node may not be capable of entering a routed state to propagate a signal to a subsequent node. En such variations, the MDC may reroute the signal path to adjacent or surrounding nodes to bypass the anomalous node before returning to the predetermined signal path. In some variations, there may be multiple anomalous nodes. In some variations multiple anomalous nodes may occur in a single signal path, in other variations, multiple anomalous nodes may occur in multiple signal paths. In one example, nodes 4025 may also be anomalous. In variations of the type discussed above, the MDC may automatically reroute the signal path to different nodes to bypass the anomalous node(s) before returning to the predetermined signal path. The MDC 4000 may be configured to recognize the deviation from the predetermined signal path due to the lack of expected return signals from the anomalous node(s) and/or due different measurements of time or other parameters for a signal path to complete.

Once one or more anomalous nodes are detected, some variations may attempt an analysis or evaluation of nodes near the anomalous node to determine details of how or why a node is in an anomalous or failed state. Such a variation is shown in FIG. 4b. In an anomaly-analysis variation, the MDC 4100 may directs the signal path selection through node 4131 to focus on nodes 4132, 4122, 4123, 4115, 4116, 417, 4125, and 4133, surrounding the node 4124 that has generated anomalous readings. The nodes engaged by the MDC 4100 may produce a return signal containing information about the integrity of the node that may be further used by the MDC 4100 to obtain further information about the environment around the anomalous node 4024. An adjacent node that includes a sensor may sense activity that induced node 4124 to become anomalous; if node 4124 become anomalous after reaching a certain temperature, a temperature sensor in node 4125 may have sensed such an increase in temperature that rendered node 4124 anomalous. Nodes 4121, 4111, 4112, 4113, 4114, 4141, 4142, 4134, 4126, 4118 may be unengaged by the MDC 4100, as they have less physical relation to the anomalous node 4124. In some variations, upon receiving a return signal that indicates an anomalous node, the MDC 4100 may engage every node in the node group 4101.

The signal paths, signal path measurements, node measurements, sensor readings, data stored in nodes, data collected about nodes, signal path selection, routing, and other related measured or measureable data about the conformal coating may he used as part of a hardware-based data encoding scheme of the type disclosed in U.S. Pat. No. 8,127,151, the entire contents of which are hereby incorporated by reference, or as part of an anti-tamper or component protection solution of the type disclosed in U.S. patent application Ser. No. 12/904,872, the entire contents of which are hereby incorporated by reference. In some variations, a return signal from one or more nodes to the MDC may serve as part or all of a basis for a key value used to activate components or decrypt data on a coated device or a device otherwise connected to the coating.

FIG. 4c shows a variation of the switched network within the conformal coating, where a return signal, representing information about a node in a node group 4210, which includes nodes 4212, 4213, 4214, 4215, 4216, and 4217, is generated by the node in response to a command signal from the MDC 4211, and received by the MDC 4211 for at least one node 4214 in the node group 4210 activated by the MDC into a signal path.

FIG. 4c also shows a variation of a hardware based encryption system, where a coating disposed on a component establishes a signal path for a switched network comprised of nodes in a node group 4210 and an MDC 4211. In such a variation, a node 4212, in response to a command from the MDC, transmits a return signal. The MDC 4211 or associated circuitry utilizes that return signal to interact with a subsequent entity. Such a subsequent entity could he one or more nodes in the node group 4210 of the switched network, the underlying component of the conformal coating, or a device associated with the underlying component or conformal coating.

In some variations, the return signal may be generated in response to a command signal sent by the MDC 4211, where the node 4212 reports or otherwise indicates the status, or does an integrity check on itself/and or on specific components within the node 4212. Such an integrity check may simply indicate if a device is operable, or could further include information regarding the integrity of components of the node. In a variation of the node 4212, the node 4212 may include a transistor array that measures and provides information about the integrity of the node 4212 itself when it receives an activation command from the MDC 4211. In some variations the return signal is utilized to facilitate interaction between the MDC 4211 and the node 4212, and determine whether a successful integrity check has occurred. For example, the result of a valid integrity check performed by the node may be predetermined; if the integrity check fails, the node may generate an anomalous return signal, which indicates to the MDC 4211 that the node 4212 has malfunctioned or been tampered with. Further, if a node 4212 has failed to emit a return signal, the MDC may acknowledge that a unsuccessful integrity check has occurred. The return signal may also be used in a multitude of other capacities, as will be further discussed.

In another variation, the MDC 4211 may collect return signal(s) from the node 4212, and perform some form of data processing on the return signal(s). In some variations, multiple return signals may be generated by one or more signal paths, which interrogate multiple nodes in the node group 4210. Multiple return signals may be received by the MDC 4211 according to a signal path generation algorithm meant to interrogate each node in a node group 4210 at least a certain number of times, as shown in FIG. 4a. A node group 4210 may include an entire network or sub-portions thereof. Although shown as continuous, grid-type portions, node groups may be any shape and size within a switched network.

In some variations, the MDC 4211 may execute more than one signal path interrogations, yielding multiple return signals. In such variations, the MDC 4211 or associated components may use or combine one or more return signals or otherwise use them to perform processing operations to generate cryptographic information or access key data or similarly coded or encrypted information. Such information may be used to activate or authorize activation of coated components such as FPGAs or enable read-out of encrypted memory portions on a coated device. In such variations, if any of the return signals are a result of an anomalous node, invalid or incorrect cryptographic information may be generated. Further, if any of the nodes in the signal path fail to emit a return signal, invalid or incorrect cryptographic information may be generated. Such invalid information may prevent proper operation of a device or proper decryption of encrypted data. In some variations, invalid cryptographic or access key information may permanently prevent operation of an FPGA or wipe or scramble encrypted memory information.

In one variation, one or more nodes in the network may also be part of a data storage or signal processing path for an encrypted or encoded or otherwise secured data storage or logic portion of a coated device. In such a variation, an anomalous return signal returned to the MDC 4211 could result in the MDC 4211 or other associated components sending a command rendering information on a node the node 4212 itself, or some combination of node components unusable or inaccessible. In a variation, the cryptographic information could be combined with the output of the node 4212, where an incorrect computation of the cryptographic information from the one or more return signals yields an invalid or improper display of the node data. In another variation, the cryptographic information may be utilized by the MDC 4211 in generating the command signal, where invalid cryptographic information creates a command signal that prevents a node 4212 from operating. A further variation uses the cryptographic information to determine if data should be outputted at all. An improper value, as known by the MDC 4211 may result in the MDC sending a command to the node preventing the node 4212 from outputting, while a proper value result in the MDC sending a command to the node that may enable outputting. In another variation, incorrect cryptographic information as known by the MDC 42.11 may trigger a command signal sent by the MDC to the node that initiates the deletion of the data stored in a memory device associated with the node 4212. In a further variation, incorrect cryptographic information may trigger a node burnout signal from the MDC 4211 to render the device inoperable.

In a still further variation, the return signal may be utilized by the MDC 4211 or associated circuitry to interact with the underlying component. In one variation, an anomalous return signal may render information on the underlying component, the component itself or some element of the component unusable or inaccessible. In such a variation, this may be accomplished by integrating the return signal of the switched network in component access commands. In one variation, the cryptographic information (created by combining or processing one or more return signals from the switched network) could also be utilized in component access commands. In a further variation, the cryptographic information may he combined with the output of the underlying component, where an incorrect computation of the cryptographic information from the one or more return signals yields an invalid or improper display of the node data. In a still further variation, the cryptographic information may be integrated with an component output command, where an incorrect value may create an invalid component output command and prevent output. In a similar variation, incorrect cryptographic information may trigger the deletion of the data stored in a memory device associated with the component through a component command. In a further variation, incorrect cryptographic information, when integrated into component commands, may trigger the burnout of the underlying component, or a particular element of the underlying component.

In another variation, the return signal may be utilized by the MDC 4211 or associated circuitry to interact with a device associated with the underlying component or the conformal coating. In one variation, an anomalous return signal may render information on the associated device, the device itself, or some element of the device unusable or inaccessible. In such a variation, this may be accomplished by integrating the return signal of the switched network in device access commands. In one variation, the cryptographic information (created by combining or processing one or more return signals from the switched network) could also be utilized in device access commands. In a further variation, the cryptographic information may be combined with the output of the associated device, where an incorrect computation of the cryptographic information from the one or more return signals yields an invalid or improper output of the device data. In a further variation, the cryptographic information may be integrated with a device output command, where an incorrect value may prevent output from the device. In a similar variation, incorrect cryptographic information may trigger the deletion of the data stored in a memory device affiliated with the associated device. In a further variation, incorrect cryptographic information, when integrated into device commands, may trigger the burnout of the device or a particular element of the underlying device.

In some variations, node sensors may he configured to trigger node burnout or cause a node to cease operation in response to a certain stimulus. Nodes configured with radiation detection, for example, may be configured to become inoperable when exposed to x-rays above a certain threshold level. Such nodes may be useful in preventing non-invasive imaging of a coated device for reverse engineering purposes.

FIG. 5*a* is one embodiment of a method of utilizing information regarding the switched network to interact with a subsequent entity. Upon an activation command signal from the MDC 5001, the node (or nodes) sends a return signal representing an integrity check to the MDC 5001, and the MDC 5001 receives the return signal, S5011. Such an integrity check could indicate if a device is operable, or could further include information regarding components of the node. The characteristics of a return signal value may be different for an invalid integrity check. If a node 5002 fails to emit a return signal, the MDC 5001 will may simply record a zero or default value as an integrity check result or may otherwise be configured to recognize that an invalid integrity check occurred. The MDC 5001 then uses the return signal to interact with a subsequent entity S5012. Such a subsequent entity could be one or more nodes of the switched network, the underlying component of the conformal coating, or a device associated with the underlying component or conformal coating. Further, the return signal may be utilized by circuitry associated with the MDC 5001 to interact with a subsequent entity. Such interaction may include providing an integrity check result to a coated component that uses the integrity check result to generate a decoding or access key for use in accessing either its own data or functions, or in accessing the data or functions of another component.

One variation of how the MDC 5101 utilizes the return signal is displayed in FIG. 5*b*. Upon an activation signal from the MDC 5101, the node sends a return signal which includes an integrity check of the node to the MDC 5101, and the MDC 5101 receives the return signal S5111. The MDC 5101 then determines whether or not the return signal is valid S5113. If the return signal is valid, the MDC recognizes that a valid integrity check has occurred at the node S5114. If the return signal is invalid, the MDC recognizes an invalid integrity check S5115 has occurred at the node.

In one variation, a return signal for a successfully integrity check is predetermined. If the value of the generated return signal matches the predetermined value, the MDC 5101 recognizes that a valid integrity check has occurred at the node. If the supplied data string is a different value than the predetermined value, the MDC recognizes an invalid integrity check.

Figure 5C:
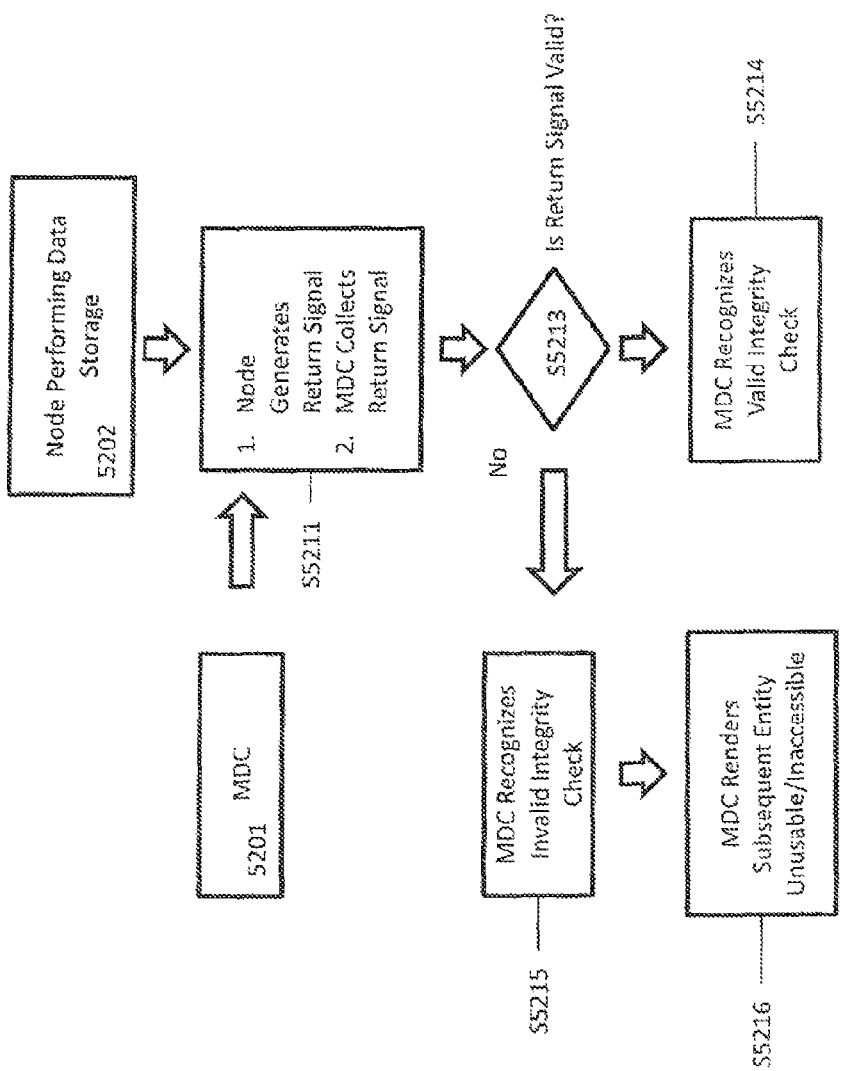
FIG. 5c depicts a variation of a technique for using information from a variation of a switched network to interact with a subsequent entity as described herein.

A further variation of the method is disclosed in FIG. 5c. At the decision step, the MDC 5201 again performs an analysis to determine if the return signal is valid S5213. If the return signal is valid, the MDC 5201 recognizes a valid integrity check at the node S5214. If the return signal is invalid, the MDC 5201 or associated circuitry recognizes an invalid integrity check S5215, and sends a command to render the subsequent entity unusable or inaccessible S5216. Such a decision step, however, is not always necessary to interact with the subsequent entity. In another variation, the return signal is integrated into a command signal within the subsequent entity, where an invalid return signal may yield anomalous results within the subsequent entity.

A further variation is shown in FIG. 5d, where once the MDC 5301 receives the return signal from the node 5302, the MDC 5301 performs processing operations on it S5317. The MDC or associated circuitry then utilizes the processed return signal to interact with the subsequent entity 55312.

Figure 5E:
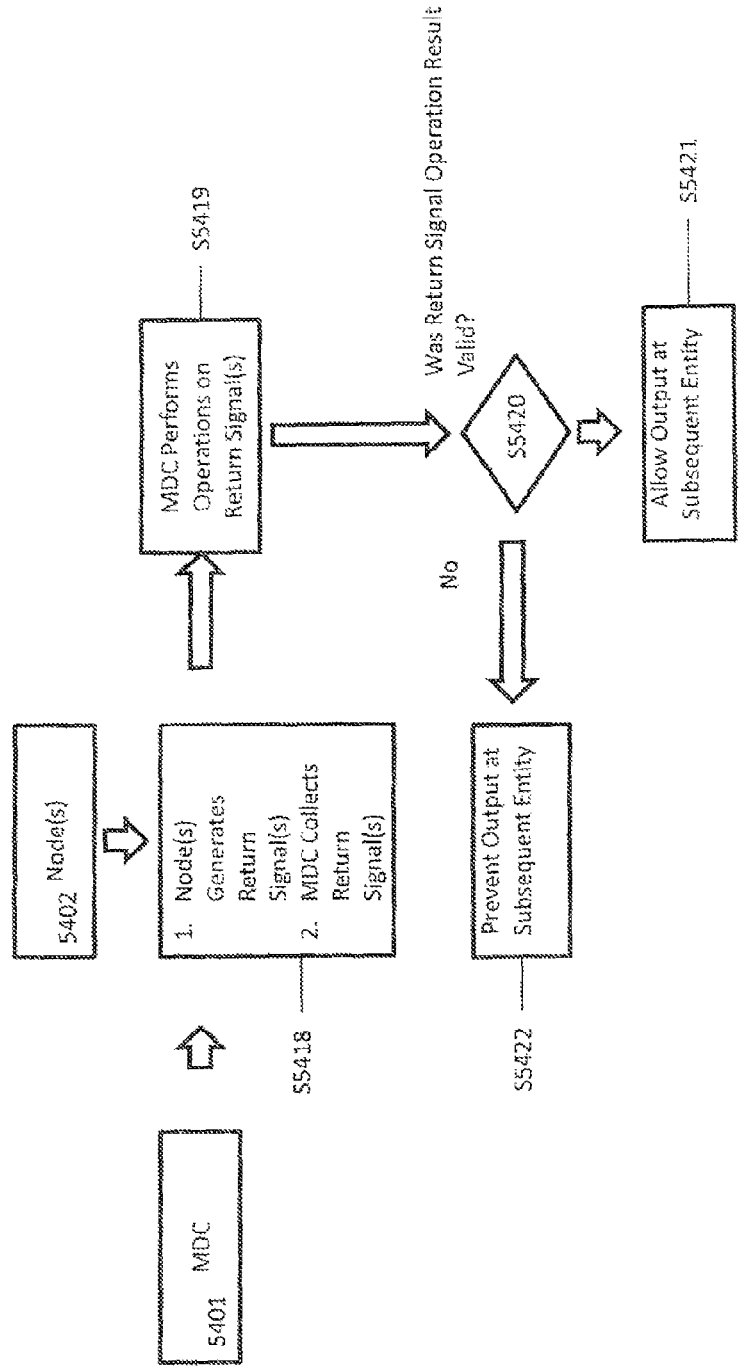
FIG. 5e depicts a variation of a technique for creating and using cryptographic information based measurements or properties of a variation of a switched network as described herein.

Still another variation, as shown in FIGS. 5e, g, and h, is where a return signal comprises one or more return signals generated by a signal path. Multiple return signals may be received by the MDC 5401, 5501, 5601, and 5701, according to a signal path generation algorithm meant to interrogate each node in the switched network at least a certain number of times S5418, S5518, S5618, and S5718, as shown in FIG. 4a. The MDC 5401, 5501, 5601, and 5701 or associated components may use or combine one or more return signals (each yielded from a different signal path) or otherwise use them to perform processing operations to generate cryptographic information. If any of the return signals are a result of an anomalous node, invalid cryptographic information may be generated. Variations of the cryptographic information may include a bit string or a signal representing a bit string for use in a digital computing environment.

In some variations, a return signal may be ancillary to the generation of cryptographic information or may be included as a spoofing tool to hide the true nature of cryptographic information generation. In one such variation, the measurement unit of the MDC may measure some or all of the possible signal paths in the network and such comparison may be evaluated against a known map of nodes and signal paths. An error-free comparison may result in the generation of cryptographic information. Such comparison operation may be masked, however, by a simultaneous routing and sensor-reading operation based, ostensibly, on the measured signal paths. In such variations, pathway decision logic may perform a function of masking power consumption signals or signatures in the network, MDC, and/or in the underlying/coated component while cryptographic information is generated based on identified changes or flaws in the network as compared to a known initial network state. In some variations, node signal routing and node state readout may also be used to make or otherwise confuse signals or signatures associated with use of the generated cryptographic information and/or data output from the encrypted device covered by/connected to the coating.

Figure 5F:
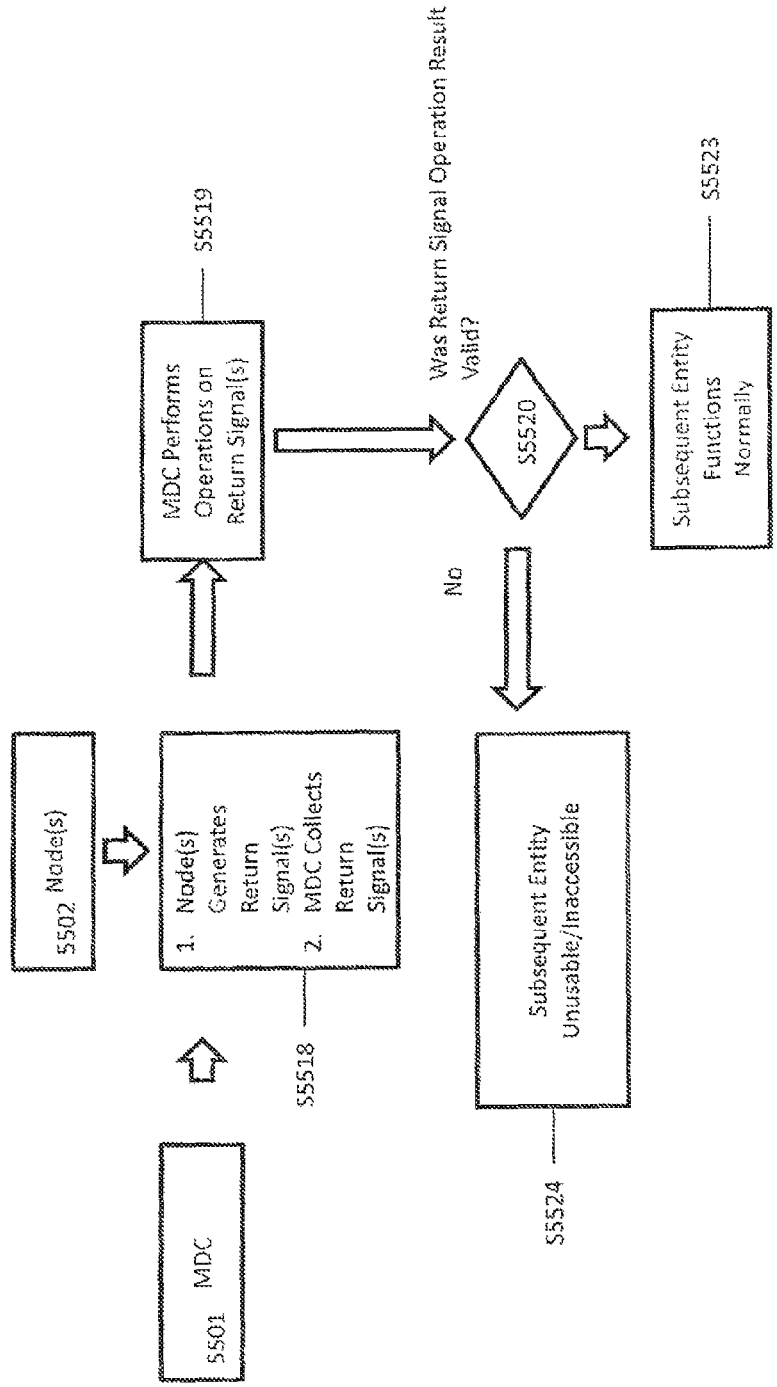
FIG. 5f depicts a variation of a technique for creating and using cryptographic information based measurements or properties of a variation of a switched network as described herein.
Figure 5G:
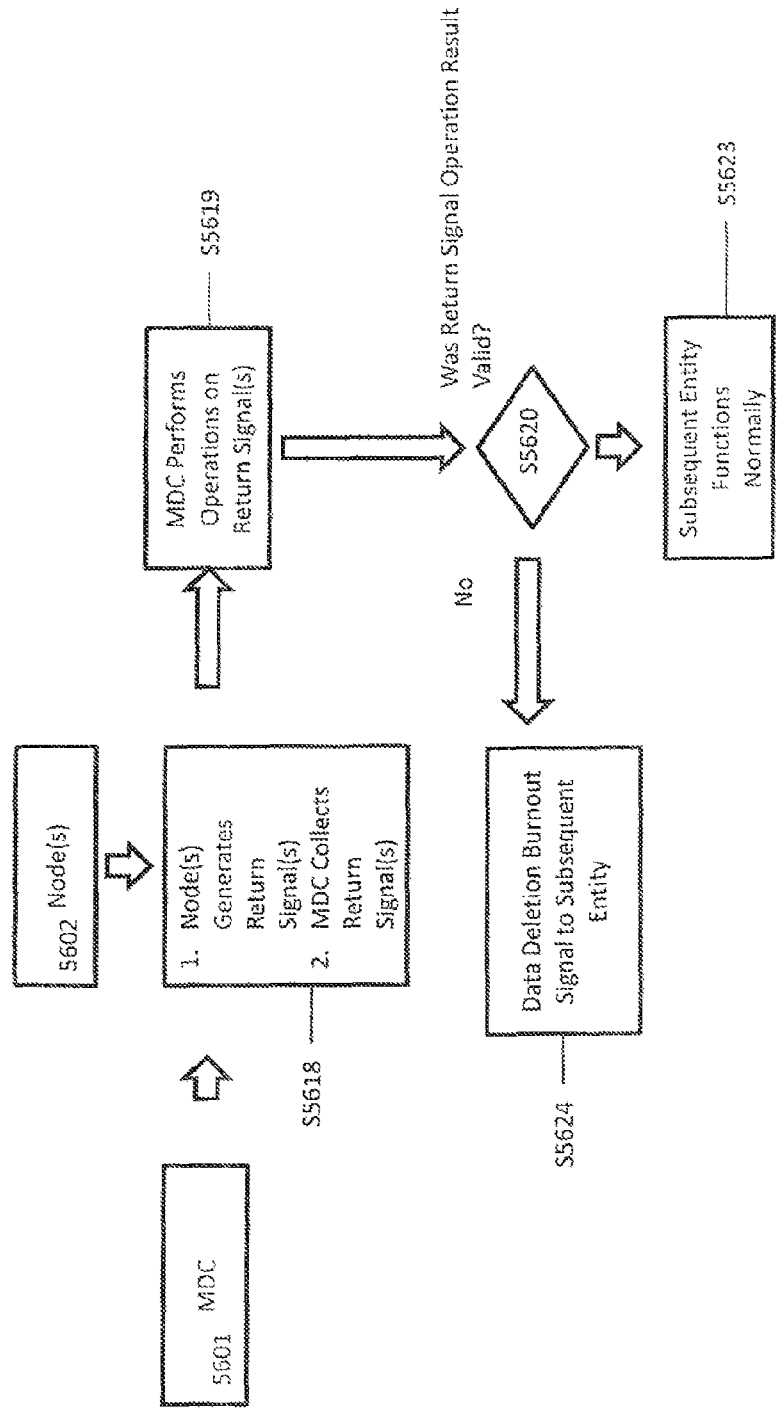
FIG. 5g depicts a variation of a technique for creating and using cryptographic information based measurements or properties of a variation of a switched network as described herein.

This cryptographic information can be used in different ways, as shown in FIGS. 5e, g, and h. In FIG. 5e, the MDC 5401 performs operation on the return signal(s) which creates cryptographic information S5419. If the return signal operation result (the cryptographic information) was valid S5420, output is allowed from the subsequent entity S5421 by the MDC or associated circuitry. If the operation was invalid S5420, output at the subsequent entity is prevented by the MDC or associated circuitry S5422. In a further variant, FIG. 5f shows that after the MDC performs operations on the return signal(s) which creates cryptographic information S5519, if the operation result was valid S5520, the subsequent entity functions normally S5523; if the operation was invalid S5520, the MDC or associated circuitry renders the subsequent entity unusable or inaccessible S5524. A still further variant is shown in FIG. 5g, which shows that after the MDC performs operations on the return signal(s) which creates cryptographic information S5619, if the operation result was valid S5620, the subsequent entity functions normally S5623; if the operation was invalid S5620, the MDC or associated circuitry sends data deletion or a burnout signal to the subsequent entity S5624.

A further variation is represented in FIG. 5h, where the MDC combines the cryptographic information with the output of the subsequent entity S5726. If the cryptographic information was correctly generated S5720, the correct output is presented S5727. If the cryptographic information derived from the return signals was invalid, incorrect output is presented S5728.

The techniques and solutions being thus described, it will be obvious that the same may be varied in many ways. Such variations are not to be regarded as departure from the spirit and scope of the invention, and all such modifications as would be obvious to one skilled in the art are intended to be included within the scope of the following claims:

The invention claimed is:

1. A conformal coating having information embedded therein, the coating comprising: an insulating layer disposed on a component; an active layer including a switched network having a plurality of nodes controlled by a master device controller (MDC); wherein a node on the switched network is configured to have dormant, active, and routed states such that said node, upon getting an activation command from the MDC, said node enters the active state, upon getting a signal routing command, said node enters the routed state, and upon getting a de-activation command from the MDC, said node enters the dormant state; wherein the node provides information about itself to the MDC via the switched network in the active state and transmits a signal from the MDC to a subsequent node along a routed signal path in the routed state; wherein the routing command causes an active node to connect to a subsequent node in said network, said subsequent node being identified in the routing command; and where the embedded information includes a measurable property of a node in a signal path in the network.

2. The coating of claim 1, said embedded information including whether or not a particular node in the network is in an anomalous state.

3. The coating of claim 1, said embedded information including cryptographic information for accessing data or functions of the component connected to said coating.

4. The coating of claim 3, where the cryptographic information is a decrypting key and the component is an encrypted memory device.

5. The coating of claim 1, where the nodes of the coating are connected to one or more underlying coated components.

6. The coating of claim 5, where the underlying coated component is part of the routed signal path.

7. The coating of claim 1, where, upon entering said routed state, the node on the switched network becomes a pass-through that routes a subsequent command signal from the MDC to the subsequent node.

8. The coating of claim 1, where the node on the switched network is connected to other nodes in a grid pattern by signal conduction paths disposed between the node on the switched network and the other nodes.

9. The coating of claim 1, said MDC including a measurement unit that measures and records a plurality of signal pathways within the switched network.

10. The coating of claim 9, wherein said measurement unit measures and records all possible signal pathways within the switched network.

11. The coating of claim 9, wherein said MDC is equipped with a pathway decision logic unit for generating signal paths based on the signal pathways recorded by the measurement unit.

12. The coating of claim 11, wherein the measurement unit includes a field programmable gate array (FPGA) and wherein the pathway decision logic includes random sequencer logic.

13. The coating of claim 11, where the MDC includes a lookup table, the measurement unit records the plurality of signal pathways as information in said lookup table and said pathway decision logic unit generating signal paths based on information recorded in said lookup table.

14. The coating of claim 1, where the MDC may directly address any node in the network.

15. The coating of claim 1, where the C can only address nodes by adding them to a routed signal path.

16. The coating of claim 1, wherein the node on the switched network includes a sensor.

17. The coating of claim 16, wherein the coating is applied to a component and the sensor is configured to detect attempts to gain access to or examine the coated component.

18. The coating of claim 17, wherein the node on the switched network includes at least two different sensor types.

19. The coating of claim 1, wherein the node on the switched network includes a controller portion that controls a connection switch disposed in the node.

20. The coating of claim 19, wherein the node on the switched network includes a transistor group, the transistor group functioning as a sensor, controller, and switch, where the sensor provides sensor information about the transistors in the transistor group.

21. The coating of claim 19, wherein the controller includes an electro-magnetic component having a number of states equal to a number of signal output or signal pass-through connections in the node on the switched network.

22. The coating of claim 19, wherein the controller includes a first electro-magnetic component and a second electro-magnetic component, where the first component is configured to connect to an incoming activation signal to establish a signal pathway into the node on the switched network and, the second component is configured to switch to one of multiple positions in response to a routing signal from the MDC, and Where the MDC maintains and stores the state and condition of each node in a signal pathway during signal pathway establishment.

23. The coating of claim 1, wherein the node on the switched network includes a connection switch configured to establish a connection to another node within the network in response to an incoming command signal.

24. The coating of claim 23, wherein the node on the switched network includes a control signal logic unit that detects an incoming control signal on a particular signal connection of the node and designates that particular signal connection as incoming and other available signal connections as outgoing.

25. The coating of claim 1, wherein the information about a node is received by the MDC for each node activated by the MDC into a signal path, and where the received information is represented as at least one bit string.

26. An apparatus for decoding encoded information stored in a component, the apparatus comprising: a conformal coating disposed on the component, the conformal coating including a switched network, the switched network having a plurality of nodes and a plurality of conduction pathways connecting the nodes; and a master device controller (MDC) operably connected to the plurality of nodes; where the MDC is configured to send a control signal to one or more of the nodes via one or more of the conduction pathways; and where the nodes are configured to provide a return signal to the MDC in response to the control signal, the return signal representing a bit string based on a signal path of the control signal through the network; and where the returned bit string includes information for providing a decoding key for decoding the encoded information stored in the component.

27. The apparatus of claim 26, where the component includes a plurality of memory portions, each of said plurality of memory portions being associated with a particular node in the switched network.

28. The apparatus of claim 26, where the coated component includes a memory portion.

29. The apparatus of claim 26, where the control signal is based on a predetermined signal path through the switched network.

30. The apparatus of claim 29, where the return signal includes information about a routed signal path through the switched network and where the decoding key is generated based on the routed signal path.

31. The apparatus of claim 30, where the predetermined signal path is associated with a valid decoding key; and where the return signal is compared to an expected return signal based on the predetermined signal path to determine if the routed signal path will generate a valid decoding key.

32. A method of recovering encryption data embedded in a switched network disposed in a conformal coating covering an encrypted component, the network having a plurality of nodes and a master device controller (MDC), the method comprising: storing information about a predetermined network signal path; sending a command signal from the MDC to one or more nodes, the command signal including one or more of an activation command, a routing command, and a de-activation command; and wherein a node on the switched network is configured to have dormant, active, and routed states such that said node, upon getting an activation command from the MDC, said node enters the active state, upon getting a signal routing command, said node enters the routed state, and upon getting a de-activation command from the MDC, said node enters the dormant state; receiving, at the MDC, a response signal that includes information about said one or more nodes and signal conduction pathways between said one or more nodes and the MDC; converting said response signal into a bit string, where said bit string includes information about a decryption key for decrypting the encrypted component covered by the conformal coating.

33. The method of claim 32, said converting including:
comparing the response signal to an expected response based on the predetermined network signal path; and only converting said response signal into the bit string when said response signal matches said expected response signal.

34. The method of claim 32, where the bit string represents a valid decryption key only when the response signal matches an expected response signal associated with the predetermined network signal path.

35. The method of claim 32, where the encrypted component is a memory device, the method further comprising: decrypting the memory device with the decryption key.

36. The method of claim 32, said decrypting including permanently altering data stored in the memory device when the decryption key is not a valid decryption key.

37. The method of claim 32, where the MDC includes a lookup table, the method further comprising: storing information about a predetermined network signal path as information in said lookup table; sending said command signal based on a routing path generated from the information stored in said lookup table; and converting said response signal into a bit string based on the information stored in said lookup table.

38. A method of recovering encryption data embedded in a switched network disposed in a conformal coating covering an encrypted component, the network having a plurality of nodes and a master device controller (MDC), the method comprising: storing information about a predetermined network signal path arrangement; measuring a current network signal path arrangement; sending a command signal from the MDC to one or more nodes based on the current network signal path arrangement, the command signal including one or more of an activation command, a routing command, and a de-activation command; and wherein a node on the switched network is configured to have dormant, active, and routed states such that said node, upon getting an activation command from the MDC, said node enters the active state, upon getting a signal routing command, said node enters the routed state, and upon getting a de-activation command from the MDC, said node enters the dormant state; receiving, at the MDC, a response signal that includes information about said one or more nodes and signal conduction pathways between said one or more nodes and the MDC; generating, during said sending, a bit string based on the current network signal path arrangement, where said bit string includes information about a decryption key for decrypting the encrypted component covered by the conformal coating.

39. The method of claim 38, where the bit string represents a valid decryption key only when the current network signal path arrangement matches the predetermined network signal path arrangement.

40. The method of claim 38, where the encrypted component is a memory device, the method further comprising: decrypting the memory device with the decryption key during said receiving.

41. The coating of claim 25, where the at least one bit string includes a representation of data encryption or data decryption information generated based on the signal path created by the activated nodes.

* * * * *

UNITED STATES PATENT AND TRADEMARK OFFICE
CERTIFICATE OF CORRECTION

PATENT NO.        : 8,869,309 B2
APPLICATION NO.   : 14/111109
DATED             : October 21, 2014
INVENTOR(S)       : Christian Adams, Matthew Kelley and David Duncan Page 1 of 1

It is certified that error appears in the above-identified patent and that said Letters Patent is hereby corrected as shown below:

IN THE CLAIMS:

Column 23, claim 15, line 33, delete "C" and insert --MDC--; and
claim 22, line 61, delete "Where" and insert --where--.

Signed and Sealed this
Tenth Day of February, 2015

Michelle K. Lee
*Deputy Director of the United States Patent and Trademark Office*